United States Patent
Kayahara et al.

(10) Patent No.: US 7,460,708 B2
(45) Date of Patent: Dec. 2, 2008

(54) SYSTEM, PROGRAM, AND METHOD FOR GENERATING VISUAL-GUIDANCE INFORMATION

(75) Inventors: Naoki Kayahara, Chino (JP); Atsushi Nagahara, Chino (JP)

(73) Assignee: Seiko Epson Corporation, Tokyo (JP)

( * ) Notice: Subject to any disclaimer, the term of this patent is extended or adjusted under 35 U.S.C. 154(b) by 657 days.

(21) Appl. No.: 10/996,588

(22) Filed: Nov. 26, 2004

(65) Prior Publication Data

US 2005/0163344 A1 Jul. 28, 2005

(30) Foreign Application Priority Data

Nov. 25, 2003 (JP) ............... 2003-394235
Jul. 20, 2004 (JP) ............... 2004-211525

(51) Int. Cl.
*G06K 9/00* (2006.01)
*G06K 9/34* (2006.01)
*G06F 17/21* (2006.01)

(52) U.S. Cl. ............ 382/176; 382/112; 382/180; 715/253

(58) Field of Classification Search ............ 382/103, 382/112, 165, 176, 180, 181, 254; 715/517, 715/243, 253

See application file for complete search history.

(56) References Cited

U.S. PATENT DOCUMENTS 5,757,963 A * 5/1998 Ozaki et al. ............... 382/209
6,934,415 B2 * 8/2005 Stentiford ................. 382/205

(Continued)

FOREIGN PATENT DOCUMENTS

JP A 06-000162 1/1994

(Continued)

OTHER PUBLICATIONS

Itti, Laurent, Christof Koch, and Ernst Neibur. "A Model of Saliency-Based Visual Attention for Rapid Scene Analysis." IEEE Transactions on Pattern Analysis and Machine Intelligence 20(1998): 1254-1259.*

(Continued)

*Primary Examiner*—Samir A. Ahmed
*Assistant Examiner*—Michael A Newman
(74) *Attorney, Agent, or Firm*—Oliff & Berridge, PLC

(57) ABSTRACT

Exemplary embodiments of the present invention provide a system to generate visual-guidance information in which the system can be reduced in size and cost and which ensures a proper eye flow. A layout unit operates in such a way that a layout image is segmented into multiple regions; the saliency features and positional information of the partial regions are calculated from image data, and the calculated saliency features are weighted. A starting-point region is then detected from among the multiple partial regions from the calculated saliency features and the reference points of the partial regions are detected from a visual-guidance feature space based on the weighted saliency features and the calculated positional information. Then the distance between the detected reference points is calculated and visual-guidance information is generated from the calculated inter-reference-point distance. The visual-guidance information is expressed as a visual-guidance path that passes through the partial regions in sequence, with a starting-point region as a starting point and a partial region having a shortest inter-reference-point distance from the preceding partial region as the following partial region.

11 Claims, 15 Drawing Sheets

U.S. PATENT DOCUMENTS

2004/0013302 A1\* 1/2004 Ma et al. .................. 382/209
2005/0069206 A1\* 3/2005 Ma et al. .................. 382/190
2005/0084136 A1\* 4/2005 Xie et al. .................. 382/107

FOREIGN PATENT DOCUMENTS

JP     A 2001-126070     5/2001

OTHER PUBLICATIONS

S. Tanaka et al.; "Extraction of Attractive Regions in Image Based Upon Amount of Physical Characteristics Contributing to Attractiveness;" Journal of the Institute of Image Information and Television Engineers; vol. 52, No. 6, pp. 881-890; 1998 (w/English-language Translation).

Y. Takeuchi et al.; "Active Vision System Based on Information Theory;" IEICE Transactions, D-II, vol. J81-DII, No. 2, pp. 323-330; Feb. 1998 (w/English-language Translation).

S. Tanaka et al.; "Figure Extraction Method Based on Color and Texture Contrasts of Regions," ATR Media Integration & Communication Research Laboratories, Graduate School of Engineering Science, Osaka University, pp. 3267-3280. (w/English-language Translation).

M. Jagersand, "Saliency Maps and Attention Selection in Scale and Spatial Coordinates: An Information Theoretic Approach," 1995 IEEE, pp. 195-202.

S. Tanaka et al., "A Figure Extraction Method Based on the Color and Texture Contrasts of Regions," Proceedings of International Conference on Image Analysis and Processing 99 ICIAP '99, 1999, pp. 12-17.

L. Itti et al., "A Model of Saliency-Based Visual Attention for Rapid Scene Analysis."

\* cited by examiner

| PARTIAL REGION | X | Y | Z | Z' |
|---|---|---|---|---|
| A | 10 | 5 | 9 | 27 |
| B | 5 | 15 | 1 | 3 |
| C | 15 | 10 | 7 | 21 |
| D | 15 | 25 | 8 | 24 |

| PARTIAL REGION | X | Y | Z | Z' |
|---|---|---|---|---|
| a | 5 | 4 | 9 | 27 |
| b | 10 | 3 | 6 | 18 |
| c | 15 | 3 | 4 | 12 |
| d | 8 | 8 | 1 | 3 |
| e | 15 | 7 | 7 | 21 |

| PARTIAL REGION | X | Y | Z' |
|---|---|---|---|
| A | 10 | 5 | 27 |
| B | 5 | 15 | 3 |
| C | 15 | 10 | 21 |
| D | 15 | 25 | 24 |

| PARTIAL REGION | X | Y | Z' |
|---|---|---|---|
| a | 5 | 4 | 27 |
| b | 10 | 3 | 18 |
| c | 15 | 3 | 12 |
| d | 8 | 8 | 3 |
| e | 15 | 7 | 21 |

| PARTIAL REGION | A | B | C | D |
|---|---|---|---|---|
| A | | | | |
| B | 26.48 | | | |
| C | 9.27 | 21.19 | | |
| D | 20.83 | 25.32 | 15.30 | |

| PARTIAL REGION | a | b | c | d | e |
|---|---|---|---|---|---|
| a | | | | | |
| b | 10.34 | | | | |
| c | 18.06 | 7.81 | | | |
| d | 24.52 | 15.94 | 12.45 | | |
| e | 12.04 | 7.07 | 9.85 | 19.34 | |

| PARTIAL REGION | X | Y | Z | Z' |
|---|---|---|---|---|
| A | 10 | 5 | 9 | 28.63 |
| B | 5 | 15 | 1 | 23.34 |
| C | 15 | 10 | 7 | 25.35 |
| D | 15 | 25 | 8 | 27.09 |

| PARTIAL REGION | A | B | C | D |
|---|---|---|---|---|
| A |  |  |  |  |
| B | 11.76 |  |  |  |
| C | 7.26 | 19.81 |  |  |
| D | 20.62 | 22.96 | 25.88 |  |

STEVEN'S POWER LAW

- S.S. Stevens

- Steven's Power Law (1957)

SENSITIVITY $\propto I^n$

- $n=1$: linear (LENGTH)
- $n<1$: compressive (BRIGHTNESS)
- $n>1$: expensive (PAIN)

SYSTEM, PROGRAM, AND METHOD FOR GENERATING VISUAL-GUIDANCE INFORMATION

BACKGROUND

Exemplary embodiments of the present invention relate to a system, a program, and a method to generate visual-guidance information on how the line of sight is guided. Exemplary embodiments further provide a system, a program, and a method to generate visual-guidance information in which the system can be reduced in size and cost and which ensure a proper eye flow.

Design-oriented documents in which layout elements (a title, an image, text, etc.) are laid out to be easily readable, such as catalogs, can be referred to as visual documents. Since a lot of specialized information may be required to create the visual documents, they are difficult for general businesspersons to prepare. Accordingly, preparation of visual documents is often outsourced to designers having expertise in design.

When producing visual documents, designers produce easy-to-read layout by arranging semantically continuous layout elements in the direction in which reader's line of sight flows (hereinafter, referred to as an eye flow). For example, assuming that one article is composed of a title, an image, and text, it is preferable to arrange them in that order. Thus, designers rearrange layout elements so as to provide easy-to-read layout through trial and error. Since designers predict the eye flow by intuition or experience, it is difficult to detect it quantitatively.

The art for detecting the eye flow and its related art include, for example, a line-of-sight information analyzer disclosed in related art document JP-A-6-162, an attention-region extraction device disclosed in related art document JP-A-2001-126070, and a saliency evaluation model disclosed in related art document Shoji Tanaka, Seiji Inokuchi, Yuichi Iwadate, and Ryohei Nakatsu, "Gazouryoiki no iro oyobi texture no contrast wo tokuchoryo to shita zuryoiki no tyusyutsu (A Figure Region Extraction Method Based on the Color and Texture Contrasts of Image Regions as Assumed Features)", the journal of Information Processing Society of Japan, Vol. 40, No. 8, 1999.

According to the invention described in related art document JP-A-6-162, eyeball movement is detected by an eyeball movement detector, the time-series change of the eyeball detected by the analyzer is analyzed in a frequency domain, and the content of a display image inputted from an image input section is analyzed by a display-content analyzer, which are integrally processed by an integrated analysis section, and thus high-reliability data on the mental state of a subject and objective evaluation of the image is provided.

The invention described in related art document JP-A-2001-126070 includes an attention-region extractor, an image generator, and a composition determination device. The image generator generates the original panoramic image from a picture photographed by a camera. The attention-region extractor extracts an attention region from the original image provided from the image generator. That is, the devices evaluate the original image according to human subjectivity by the physical features of the original image and extract an attention region from the evaluation. The composition determination device cuts out the extracted attention region and its adjacent image region from the original image with reference to data on a picture drawn by a painter or a photograph taken by a photographer, stored in a memory. Briefly, the device can cut out the regions in the same composition as the picture image or the photographed image.

Related art document Shoji Tanaka, Seiji Inokuchi, Yuichi Iwadate, and Ryohei Nakatsu, "Gazouryoiki no iro oyobi texture no contrast wo tokuchoryo to shita zuryoiki no tyusyutsu (A Figure Region Extraction Method Based on the Color and Texture Contrasts of Image Regions as Assumed Features)", the journal of Information Processing Society of Japan, Vol. 40, No. 8, 1999 describes the concept of saliency introduced in the invention of related art document JP-A-2001-126070 and its concrete calculation method.

SUMMARY

The invention described in related art document JP-A-6-162, however, has the problem that the device is large in size and cost because an eye flow is detected by an eye camera etc. When performing layout while detecting designers' own eye flow by using the invention of related art document JP-A-6-162, designers get used to seeing the layout by viewing similar layout repeatedly or become conscious of an eye flow expected by themselves, thus having the possibility that an eye flow when a third person first looks at the layout and the actual designers' eye flow will not agree with each other. Designers intend to provide easy-to-read layout for readers who first look at the layout. It is therefore the eye flow of a person who first looks at the layout that designers need. Accordingly, the invention of related art JP-A-6-162 has the problem that it is difficult for designers to determine a proper eye flow even if they perform layout while detecting their own eye flow, making it difficult to provide easy-to-read layout.

According to the invention of related document JP-A-6-162, the correspondence between image features extracted from the image of a visual document and line-of-sight features measured by a measuring instrument is learned. After the leaned results have been accumulated, only if the image features are given, line-of-sight features can be estimated from the image features and the leaned results.

However, with employing the leaning method, if the given image features are learned ones, a proper eye flow is determined; if they are not learned ones, no proper eye flow is provided. This therefore has the disadvantage of not providing sufficient reliability without much learning.

According to the inventions of related art document JP-A-2001-126070 and related art document Shoji Tanaka, Seiji Inokuchi, Yuichi Iwadate, and Ryohei Nakatsu, "Gazouryoiki no iro oyobi texture no contrast wo tokuchoryo to shita zuryoiki no tyusyutsu (A Figure Region Extraction Method Based on the Color and Texture Contrasts of Image Regions as Assumed Features)", the journal of Information Processing Society of Japan, Vol. 40, No. 8, 1999, an attention region is extracted from an image. Accordingly, it is assumed that the line of sight can easily be guided into the attention region from the extraction result at the best. With presence of multiple attention regions in the image, an eye flow cannot be determined merely by extracting the attention regions. Briefly, it cannot be grasped how the line of sight is guided through the attention regions.

Exemplary embodiments of the present invention address the above and/or other unsolved problems of the related art, and provide a system, a program, and a method to generate visual-guidance information in which the system can be reduced in size and cost and which ensure a proper eye flow.

The inventors have paid attention to the fact that, to apply an eye flow to layout, it is recommended to determine how the line of sight tends to be guided through attention regions, with layout elements in a layout region assumed as the attention regions. In observing an image having multiple attention regions, the inventors have found that human sense has the characteristics that the line of sight tends to be first guided into an attention region having the highest saliency. Next, the line of sight tends to be guided into an attention region having lower saliency from the highest-saliency attention region. Thus, the inventors have considered to form a visual guidance path that passes through the attention regions in sequence in descending order of saliency and determines the formed visual guidance path as an eye flow.

However, when there are a first attention region, a second attention region, and a third attention region in descending order of saliency, in which the third attention region is present between the first attention region and the second attention region, the line of sight is not necessarily guided in order of the first attention region, the second attention region, and the third attention region and, under certain circumstances, the line of sight can be guided in order of the first attention region, the third attention region, and the second attention region.

After a detailed study of the phenomena, the inventors have found that the line of sight is not guided simply in order of saliency but the factors of visual guidance include the distance among the attention regions. The inventors have therefore concluded that it is appropriate to determine an eye flow in consideration of the position of the attention regions in addition to the saliency of the attention regions.

Exemplary Embodiment 1

In order to address or achieve the above objects, a visual-guidance-information generation system according to Exemplary Embodiment 1 is a system to generate visual-guidance information indicating how the line of sight is guided through the segmented multiple partial regions of an image. The system includes a saliency-feature acquisition device to acquire saliency features indicative of the degree of focusing attention on the partial regions; a positional-information acquisition device to acquire positional information indicative of the position of the partial regions in the image; and a visual-guidance-information generation device to generate the visual-guidance information based on the saliency features acquired by the saliency-feature acquisition device and the positional information acquired by the positional-information acquisition device.

With such a structure, the saliency features of the partial region are acquired by the saliency-feature acquisition device. The positional information of the partial region is acquired by the positional-information acquisition device. The visual-guidance information is generated based on the acquired saliency features and positional information, by the visual-guidance-information generation device.

Accordingly, visual-guidance information can be generated based on objective information and features of the partial regions without being influenced by the subjectivity of designers or other editors. This allows quantitative calculation on how the line of sight tends to be guided through partial regions. Also, the visual-guidance information is generated in view of the position of partial regions in addition to the saliency features. This allows relatively proper calculation on how the line of sight tends to be guided through partial regions. Accordingly, a relatively proper eye flow (visual-guidance information) can be determined quantitatively as compared with the related art.

Since there is no need to provide an eye camera etc. separately, the size and cost of the system can be reduced as compared with the related art.

Since the saliency features are not calculated by learning, a proper eye flow can be determined relatively reliably.

The saliency-feature acquisition device may have any structure in which the saliency features of the partial regions are acquired. For example, the saliency features may be inputted from an input unit etc., may be acquired from an external unit etc. or may be calculated from image data etc. Briefly, the acquisition includes at least input, acquisition, and calculation.

The positional-information acquisition device may have any structure in which the positional information of the partial regions is acquired. For example, the positional information may be inputted from an input unit etc., may be acquired from an external unit etc., or may be calculated from image data etc. Briefly, the acquisition includes at least input, acquisition, and calculation.

The system may be addressed or achieved by a single unit, terminal, or equipment or, alternatively, by a network system connected to multiple units, terminals, other equipment in communication with one another. In the latter case, the components may be included in any of the multiple equipment that are communicated with one another. The same applies to the visual-guidance-information generation system according to Exemplary Embodiment 2.

Exemplary Embodiment 2

A visual-guidance-information generation system according to Exemplary Embodiment 2 is a system to generate visual-guidance information indicating how the line of sight is guided through segmented multiple partial regions of an image. The system includes a saliency-feature calculation device to calculate saliency features indicative of the degree of focusing attention on the partial regions; a positional-information calculation device to calculate positional information indicative of the position of the partial regions in the image; and a visual-guidance-information generation device to generate the visual-guidance information based on the saliency features calculated by the saliency-feature calculation device and the positional information calculated by the positional-information calculation device.

With such a structure, the saliency features of the partial regions are calculated by the saliency-feature calculation device. The positional information of the partial regions is calculated by the positional-information calculation device. The visual-guidance information is generated based on the calculated saliency features and positional information.

Accordingly, the visual-guidance information is generated based on the objective information and features of the partial regions without being influenced by the subjectivity of designers or other editors, so that it can be calculated quantitatively how the line of sight tends to be guided through the partial regions. Since the visual-guidance information is generated in consideration of the position of the partial regions in addition to the saliency of the partial regions, it can be relatively properly calculated how the line of sight tends to be guided. Accordingly, a relatively proper eye flow can be determined quantitatively as compared with the related art.

Since there is no need to provide an eye camera etc. separately, the size and cost of the system can be reduced as compared with the related art.

Since the saliency features are not calculated by learning, a proper eye flow can be determined relatively reliably.

Exemplary Embodiment 3

The visual-guidance-information generation system according to Exemplary Embodiment 1 or 2, further includes a starting-point-region detection device to detect a starting-point region from among the multiple partial regions based on the saliency features. The visual-guidance-information generation device forms a visual guidance path to guide the line of sight with the starting-point region detected by the starting-point-region detection device as a starting point and generates visual-guidance information indicative of the formed visual guidance path.

With such a structure, a starting-point region is detected from among multiple partial regions on the basis of the saliency features by the starting-point-region detection device. A visual guidance path is formed by the visual-guidance-information generation device, with the detected starting point region as a starting point, and visual-guidance information indicative of the formed visual guidance path is generated.

Accordingly, the starting-point partial region is detected based on the objective features of the partial regions without being influenced by the subjectivity of designers, or other editors. Accordingly, the starting point of the eye flow can be determined quantitatively.

Exemplary Embodiment 4

In the visual-guidance-information generation system according to Exemplary Embodiment 3, the starting-point-region detection device detects a region having the highest saliency feature of the multiple partial regions as the starting-point region on the basis of the saliency features.

With such structure, a region having the highest saliency feature of the multiple partial regions is detected as the starting-point region on the basis of the saliency features by the starting-point-region detection device.

Thus, the starting-point partial region is detected by using the characteristic that the line of sight tends to be guided to a region having the highest saliency feature at a first sight of the image, so that the starting point of the eye flow can be determined relatively properly.

Exemplary Embodiment 5

The visual-guidance-information generation system, further includes a reference-point detection device to detect the reference points of the partial regions from the visual-guidance feature space in which the saliency features and the factors of the positional information are plotted in different axes; and a inter-reference-point-distance calculation device to calculate the distances among the reference points detected by the reference-point detection device. The visual-guidance-information generation device generates the visual-guidance information based on the inter-reference-point distances calculated by the inter-reference-point-distance calculation device.

With such a structure, the reference points of the partial regions are detected from the visual-guidance feature space by the reference-point detection device. The distances among the detected reference points are calculated by the inter-reference-point-distance calculation device. The visual-guidance information is generated based on the calculated inter-reference-point distances by the visual-guidance-information generation device.

Since the visual-guidance information is generated with the saliency and position of the partial regions expressed as the distances on the visual-guidance feature space, the saliency and position of the partial regions can be reflected to the generation of visual-guidance information relatively properly. This offers a more proper eye flow.

Exemplary Embodiment 6

In the visual-guidance-information generation system according to Exemplary Embodiment 5, the visual-guidance-information generation device generates visual-guidance information indicative of a visual guidance path that passes through the partial regions in sequence based on the inter-reference-point distances calculated by the inter-reference-point-distance calculation device.

With such a structure, the visual-guidance information indicative of a visual guidance path that passes through the partial regions in sequence is generated based on the calculated inter-reference-point distances by the visual-guidance-information generation device.

This facilitates grasping how the line of sight tends to be guided through the partial regions with reference to the visual-guidance information.

Exemplary Embodiment 7

In the visual-guidance-information generation system according to Exemplary Embodiment 6, the visual-guidance-information generation device forms the visual guidance path that passes through the partial regions in sequence, with a prescribed starting-point region of the multiple partial regions as a starting point and with a partial region having the shortest inter-reference-point distance from the preceding partial region as the following partial region, and generates visual-guidance information indicative of the formed visual guidance path.

With such a structure, a visual guidance path that passes through the partial regions in sequence is formed by the visual-guidance-information generation device with a prescribed starting point region of multiple partial regions as a starting point and with a partial region having the shortest inter-reference-point distance from the preceding partial region as the following partial region, and then visual-guidance information indicative of the formed visual guidance path is generated.

Accordingly, the visual guidance path is formed by using the characteristic that the line of sight tends to be guided from a region with high saliency to a region with low saliency. Thus offers a more proper eye flow.

Exemplary Embodiment 8

The visual-guidance-information generation system according to Exemplary Embodiment 7 further includes a starting-point-region detection device to detect the starting-point region from among the multiple partial regions based on the saliency features. The visual-guidance-information generation device forms the visual guidance path with the starting-point region detected by the starting-point-region detection device as a starting point.

With such a structure, the starting-point region is detected from among the multiple partial regions based on the saliency features by the starting-point-region detection device. The visual guidance path is formed by the visual-guidance-information generation device with the detected starting-point region as a starting point.

Accordingly, the starting-point partial region is detected based on the objective features of the partial regions without being influenced by the subjectivity of designers or other editors. Accordingly, a relatively proper starting point of the eye flow can be determined quantitatively.

Exemplary Embodiment 9

In the visual-guidance-information generation system according to Exemplary Embodiment 8, the starting-point-region detection device detects a region having the highest saliency feature of the multiple partial regions as the starting-point region on the basis of the saliency features.

With such a structure, a region having the highest saliency feature of the multiple partial regions is detected as the starting-point region based on the saliency features by the starting-point-region detection device.

Accordingly, the starting-point region is detected by using the characteristic that the line of sight tends to be guided into a region with the highest saliency at a first sight of an image. Thus the starting point of the eye flow can be determined relatively properly.

Exemplary Embodiment 10

The visual-guidance-information generation system according to one of Exemplary Embodiments 5 to 9 further includes a scale change device to change the scale of any of the axes of the visual-guidance feature space.

With such a structure, the scale of any of the axes of the visual-guidance feature space can be changed by the scale change device.

This allows adjustment on how saliency and position of the partial regions are reflected to the generation of visual-guidance information.

Exemplary Embodiment 11

A visual-guidance-information generation program according to Exemplary Embodiment 11 is a program to generate visual-guidance information indicating how the line of sight is guided through the segmented multiple partial regions of an image. The program includes a program for a computer to execute the process of: acquiring saliency features indicative of the degree of focusing attention on the partial regions; acquiring positional information indicative of the position of the partial regions in the image; and generating the visual-guidance information based on the saliency features acquired in the saliency-feature acquisition and the positional information acquired in the positional-information acquisition.

With such a structure, the program is read by a computer. When the computer executes processing in accordance with the read program, the same operation and advantages as those of the visual-guidance-information generation system according to Exemplary Embodiment 1 are offered.

The saliency-feature acquisition may be any in which the saliency features of the partial regions are acquired. For example, the saliency features may be inputted from an input unit etc., may be acquired from an external unit etc. or may be calculated from image data etc. Briefly, the acquisition includes at least input, acquisition, and calculation. The same applies to the visual-guidance-information generation method according to Exemplary Embodiment 21.

The positional-information acquisition may be any in which the positional information of the partial regions is acquired. For example, the positional information may be inputted from an input unit etc., may be acquired from an external unit etc. or may be calculated from image data etc. Briefly, the acquisition includes at least input, acquisition, and calculation. The same applies to the visual-guidance-information generation method according to Exemplary Embodiment 21.

Exemplary Embodiment 12

A visual-guidance-information generation program according to Exemplary Embodiment 12 is a program to generate visual-guidance information indicating how the line of sight is guided through segmented multiple partial regions of an image. The program includes a program for a computer to execute the process including: calculating saliency features indicative of the degree of focusing attention on the partial regions; calculating positional information indicative of the position of the partial regions in the image; and generating the visual-guidance information based on the saliency features calculated in the saliency-feature calculation and the positional information calculated in the positional-information calculation.

With such a structure, the program is read by a computer. When the computer executes processing in accordance with the read program, the same operation and advantages as those of the visual-guidance-information generation system according to Exemplary Embodiment 2 are offered.

Exemplary Embodiment 13

The visual-guidance-information generation program according to Exemplary Embodiment 11 or 12 further includes a program for a computer to execute a process including detecting the starting-point region from among the multiple partial regions based on the saliency features. In the visual-guidance-information generation, a visual guidance path to guide the line of sight is formed with the starting-point partial region detected in the starting-point-region detection as the starting point and the formed visual guidance path is shown.

With such a structure, the program is read by a computer. When the computer executes processing in accordance with the read program, the same operation and advantages as those of the visual-guidance-information generation system according to Exemplary Embodiment 3 are offered.

Exemplary Embodiment 14

In the visual-guidance-information generation program according to Exemplary Embodiment 13, in the starting-point-region detection, a region having the highest salient feature of the multiple partial regions is detected as the starting point partial region on the basis of the salient features.

With such a structure, the program is read by a computer. When the computer executes processing in accordance with the read program, the same operation and advantages as those of the visual-guidance-information generation system according to Exemplary Embodiment 4 are offered.

Exemplary Embodiment 15

The visual-guidance-information generation program according to Exemplary Embodiment 11 or 12 further includes detecting the reference points of the partial regions from the visual-guidance feature space in which the saliency features and the factors of the positional information are plotted in different axes; and calculating the distances among the reference points detected in the reference-point detection. In the visual-guidance-information generation, the visual-guidance information is generated based on the inter-reference-point distances calculated in the inter-reference-point-distance calculation.

With such a structure, the program is read by a computer. When the computer executes processing in accordance with the read program, the same operation and advantages as those of the visual-guidance-information generation system according to Exemplary Embodiment 5 are offered.

Exemplary Embodiment 16

In the visual-guidance-information generation program according to Exemplary Embodiment 15, in the visual-guidance-information generation, visual-guidance information indicative of a visual guidance path that passes through the partial regions in sequence is generated based on the inter-reference-point distances calculated in the inter-reference-point-distance calculation.

With such a structure, the program is read by a computer. When the computer executes processing in accordance with the read program, the same operation and advantages as those of the visual-guidance-information generation system according to Exemplary Embodiment 6 are offered.

Exemplary Embodiment 17

In the visual-guidance-information generation program according to Exemplary Embodiment 16, in the visual-guidance-information generation, the visual guidance path that passes through the partial regions in sequence is formed with a prescribed starting-point region of the multiple partial regions as a starting point and with a partial region having the shortest inter-reference-point distance from the preceding partial region as the following partial region, and visual-guidance information indicative of the formed visual guidance path is generated.

With such a structure, the program is read by a computer. When the computer executes processing in accordance with the read program, the same operation and advantages as those of the visual-guidance-information generation system according to Exemplary Embodiment 7 are offered.

Exemplary Embodiment 18

In the visual-guidance-information generation program according to Exemplary Embodiment 17 further includes a program for a computer to execute a process including detecting the starting-point region from among the multiple partial regions based on the saliency features. In the visual-guidance-information generation, the visual guidance path is formed with the starting-point region detected in the starting-point-region detection as a starting point.

With such a structure, the program is read by a computer. When the computer executes processing in accordance with the read program, the same operation and advantages as those of the visual-guidance-information generation system according to Exemplary Embodiment 8 are offered.

Exemplary Embodiment 19

In the visual-guidance-information generation program according to Exemplary Embodiment 18, in the starting-point-region detection, a region having the highest saliency feature of the multiple partial regions is detected as the starting-point region on the basis of the saliency features.

With such a structure, the program is read by a computer. When the computer executes processing in accordance with the read program, the same operation and advantages as those of the visual-guidance-information generation system according to Exemplary Embodiment 9 are offered.

Exemplary Embodiment 20

The visual-guidance-information generation program according to one of Exemplary Embodiments 15 to 19 further includes a program for a computer to execute a process including a scale change step of changing the scale of any of the axes of the visual-guidance feature space.

With such a structure, the program is read by a computer. When the computer executes processing in accordance with the read program, the same operation and advantages as those of the visual-guidance-information generation system according to Exemplary Embodiment 10 are offered.

Exemplary Embodiment 21

In order to address or achieve the above object, a visual-guidance-information generation method according to Exemplary Embodiment 21 is a method to generate visual-guidance information indicating how the line of sight is guided through the segmented multiple partial regions of an image. The method includes acquiring saliency features indicative of the degree of focusing attention on the partial regions; acquiring positional information indicative of the position of the partial regions in the image; and generating the visual-guidance information based on the saliency features acquired in the saliency-feature acquisition and the positional information acquired in the positional-information acquisition.

This offers the same advantages as those of the visual-guidance-information generation system according to Exemplary Embodiment 1.

Exemplary Embodiment 22

A visual-guidance-information generation method according to Exemplary Embodiment 22 is a method to generate visual-guidance information indicating how the line of sight is guided through segmented multiple partial regions of an image. The method includes calculating saliency features indicative of the degree of focusing attention on the partial regions; calculating positional information indicative of the position of the partial regions in the image; and generating the visual-guidance information based on the saliency features calculated in the saliency-feature calculation and the positional information calculated in the positional-information calculation.

This offers the same advantages as those of the visual-guidance-information generation system according to Exemplary Embodiment 2.

Exemplary Embodiment 23

The visual-guidance-information generation method according to Exemplary Embodiment 21 or 22 further includes detecting a starting-point region from among the multiple partial regions based on the saliency features. The visual-guidance-information generation device forms a visual guidance path to guide the line of sight with the starting-point region detected in the starting-point-region detection as a starting point and generates visual-guidance information indicative of the formed visual guidance path.

This offers the same advantages as those of the visual-guidance-information generation system according to Exemplary Embodiment 3.

Exemplary Embodiment 24

In the visual-guidance-information generation method according to Exemplary Embodiment 23, in the starting-point-region detection, a region having the highest saliency feature of the multiple partial regions is detected as the starting-point region on the basis of the saliency features.

This offers the same advantages as those of the visual-guidance-information generation system according to Exemplary Embodiment 4.

Exemplary Embodiment 25

The visual-guidance-information generation method according to Exemplary Embodiment 21 or 22 further includes detecting the reference points of the partial regions from the visual-guidance feature space in which the saliency features and the factors of the positional information are plotted in different axes; and calculating the distances among the reference points detected by the reference-point detection device. In the visual-guidance-information generation, the visual-guidance information is generated based on the inter-reference-point distances calculated in the inter-reference-point-distance calculation.

This offers the same advantages as those of the visual-guidance-information generation system according to Exemplary Embodiment 5.

Exemplary Embodiment 26

In the visual-guidance-information generation method according to Exemplary Embodiment 25, in the visual-guidance-information generation, visual-guidance information indicative of a visual guidance path that passes through the partial regions in sequence is generated based on the inter-reference-point distances calculated in the inter-reference-point-distance calculation.

This offers the same advantages as those of the visual-guidance-information generation system according to Exemplary Embodiment 6.

Exemplary Embodiment 27

In the visual-guidance-information generation method according to Exemplary Embodiment 26, in the visual-guidance-information generation, the visual guidance path that passes through the partial regions in sequence is formed with a prescribed starting-point region of the multiple partial regions as a starting point and with a partial region having the shortest inter-reference-point distance from the preceding partial region as the following partial region, and visual-guidance information indicative of the formed visual guidance path is generated.

This offers the same advantages as those of the visual-guidance-information generation system according to Exemplary Embodiment 7.

Exemplary Embodiment 28

The visual-guidance-information generation method according to Exemplary Embodiment 27 further includes detecting the starting-point region from among the multiple partial regions based on the saliency features. In the visual-guidance-information generation, the visual guidance path is formed with the starting-point region detected in the starting-point-region detection as a starting point.

This offers the same advantages as those of the visual-guidance-information generation system according to Exemplary Embodiment 8.

Exemplary Embodiment 29

In the visual-guidance-information generation method according to Exemplary Embodiment 28, in the starting-point-region detection, a region having the highest saliency feature of the multiple partial regions is detected as the starting-point region on the basis of the saliency features.

This offers the same advantages as those of the visual-guidance-information generation system according to Exemplary Embodiment 9.

Exemplary Embodiment 30

The visual-guidance-information generation method according to one of Exemplary Embodiments 25 to 29 further includes a scale change step of changing the scale of any of the axes of the visual-guidance feature space.

This offers the same advantages as those of the visual-guidance-information generation system according to Exemplary Embodiment 10.

DETAILED DESCRIPTION OF EMBODIMENTS

Exemplary embodiments of the present invention will be described with reference to the drawings. FIGS. 1 to 23 show a system, a program, and a method to generate visual-guidance information according to an exemplary embodiment of the invention.

This exemplary embodiment is an application of the system, the program, and the method to generate visual-guidance information according to exemplary embodiment of the invention for generation of visual-guidance information on how the line of sight is guided through multiple layout elements of a layout image.

Figure 1:
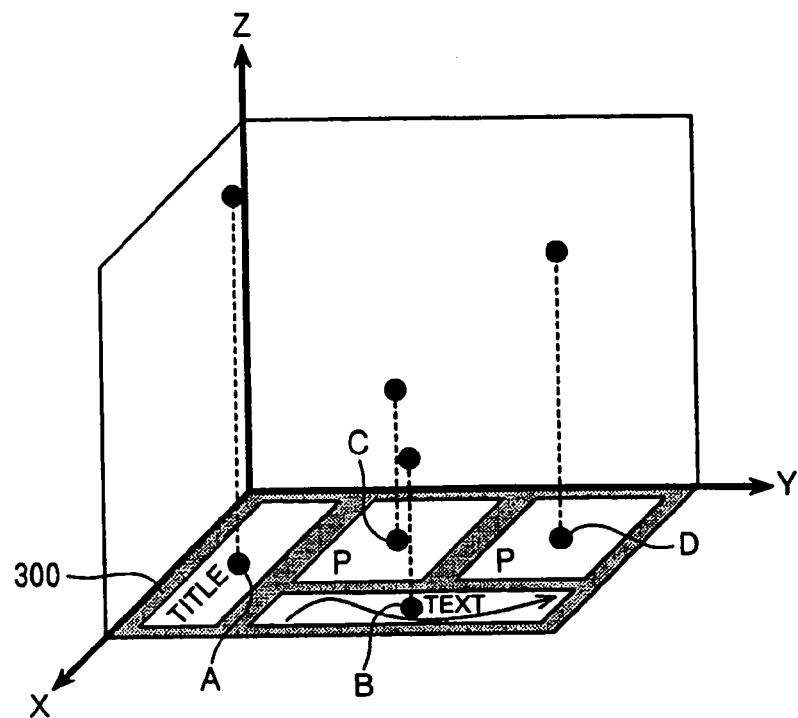
FIG. 1 is a schematic diagram showing the distribution of layout elements in a visual-guidance feature space.
Figure 2:
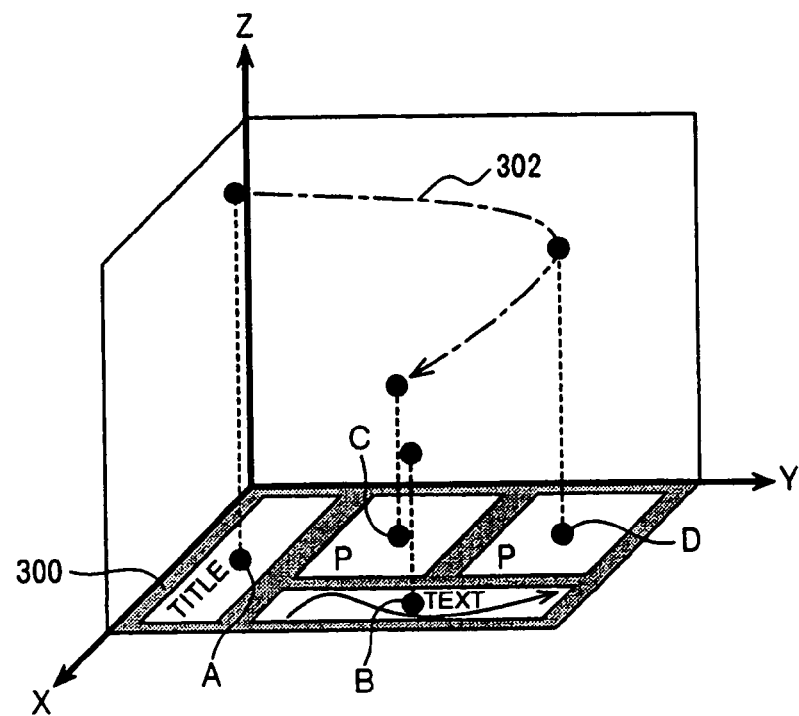
FIG. 2 is a schematic diagram showing a visual guidance path 302 through which the line of sight is guided through the layout elements.
Figure 3:
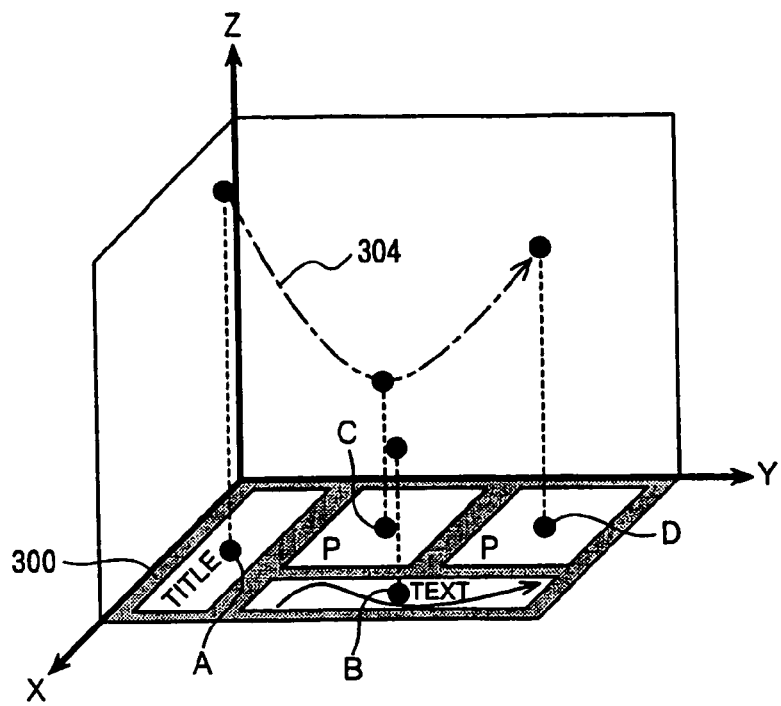
FIG. 3 is a schematic diagram showing a visual guidance path 304 through which the line of sight is guided through the layout elements.

Referring to FIGS. 1 to 3, the general outline of the invention will be described hereinbelow.

FIG. 1 is a schematic showing the distribution of layout elements in a visual-guidance feature space.

As shown in FIG. 1, a layout image 300 includes four layout elements, a title A, a text B, a photograph C, and a photograph D define a visual-guidance feature space in three dimensions. The visual-guidance feature space is plotted with the lateral direction of the layout image 300 as the X-axis, the vertical direction as the Y-axis, and saliency features indicative of the degree of focusing attention on the layout elements as the Z-axis, respectively. In the example of FIG. 1, the height of the end of a dotted line extending from the barycenter of each layout element in the Z-axis direction indicates the amount of the saliency feature. Accordingly, the saliency feature is the highest for the title A, and decreases in order of the photograph D, the photograph C, and the text B.

FIG. 2 is a schematic showing a visual guidance path 302 through which the line of sight is guided through the layout elements.

When the visual guidance path is formed simply in order of decreasing saliency features, the visual guidance path 302 can be formed, as shown in FIG. 2, which passes through the layout elements in order of the title A having the highest saliency features as a starting point, the photograph D, the photograph C, and the text B. However, since the title A and the photograph D are separated from each other, the line of sight is not always guided in that order. Although FIG. 2 shows the visual guidance path 302 only to the photograph C for the purpose of simplification and illustration, the visual guidance path 302 continues actually from the photograph C to the text B.

FIG. 3 is a schematic showing a visual guidance path 304 through which the line of sight is guided through the layout elements.

It is appropriate to form the visual guidance path in consideration of not only the saliency features but also the position of the layout elements. In that case, as shown in FIG. 3, the visual guidance path 304 can be formed which passes through the layout elements in order of the title A as the starting point, the photograph C, the photograph D, and the text B. The visual guidance path 302 is sometimes formed depending on the saliency features and the position of the layout elements, even if the position of the layout elements is taken into consideration. Although FIG. 3 shows the visual guidance path 304 only to the photograph D for the purpose of simplification and illustration, the visual guidance path 304 continues actually from the photograph D to the text B.

The exemplary embodiment is directed to an appropriate eye flow by discriminating the visual guidance path 302 and the visual guidance path 304 from each other depending on the saliency features and the position of layout elements.

Figure 4:
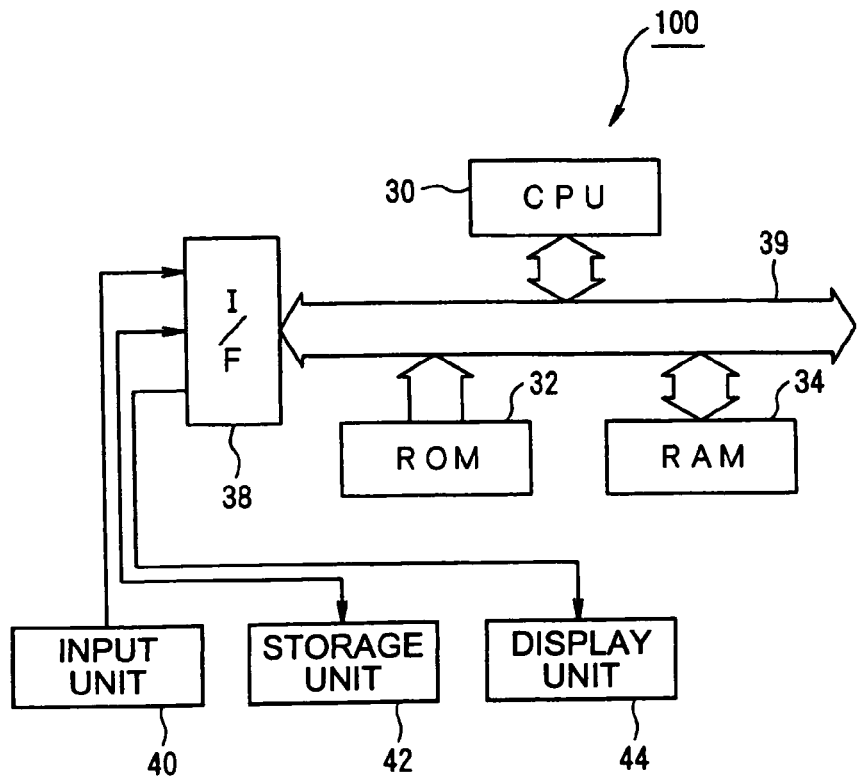
FIG. 4 is a schematic block diagram of the structure of a layout unit 100.

Referring then to FIG. 4, the structure of a layout unit 100 incorporating exemplary embodiments of the invention will be described.

FIG. 4 is a block diagram of the structure of the layout unit 100.

As shown in FIG. 4, the layout unit 100 includes a CPU 30 to control the operation and the entire system in accordance with a control program, an ROM 32 to store the control program for the CPU 30 in a specified region in advance, a RAM 34 to store data read out from the ROM 32 etc. and calculation results necessary for the calculation process of the CPU 30, and an interface (I/F) 38 which mediates the input/output of data to external devices. They are connected with one another so as to transmit/receive data via a bus 39 serving as signal line for transferring data.

The I/F 38 connects to external units, such as an input unit 40 including a keyboard, a mouse, etc. capable of inputting data as a human interface, a storage unit 42 to file data, tables, etc., and a display unit 44 to display images according to image signals.

The CPU 30 includes a micro processing unit (MPU) etc. The CPU 30 starts up a predetermined program held in a specified region in the ROM 32 to execute a visual-guidance-information generation process shown in the flowchart of FIG. 5.

Figure 5:
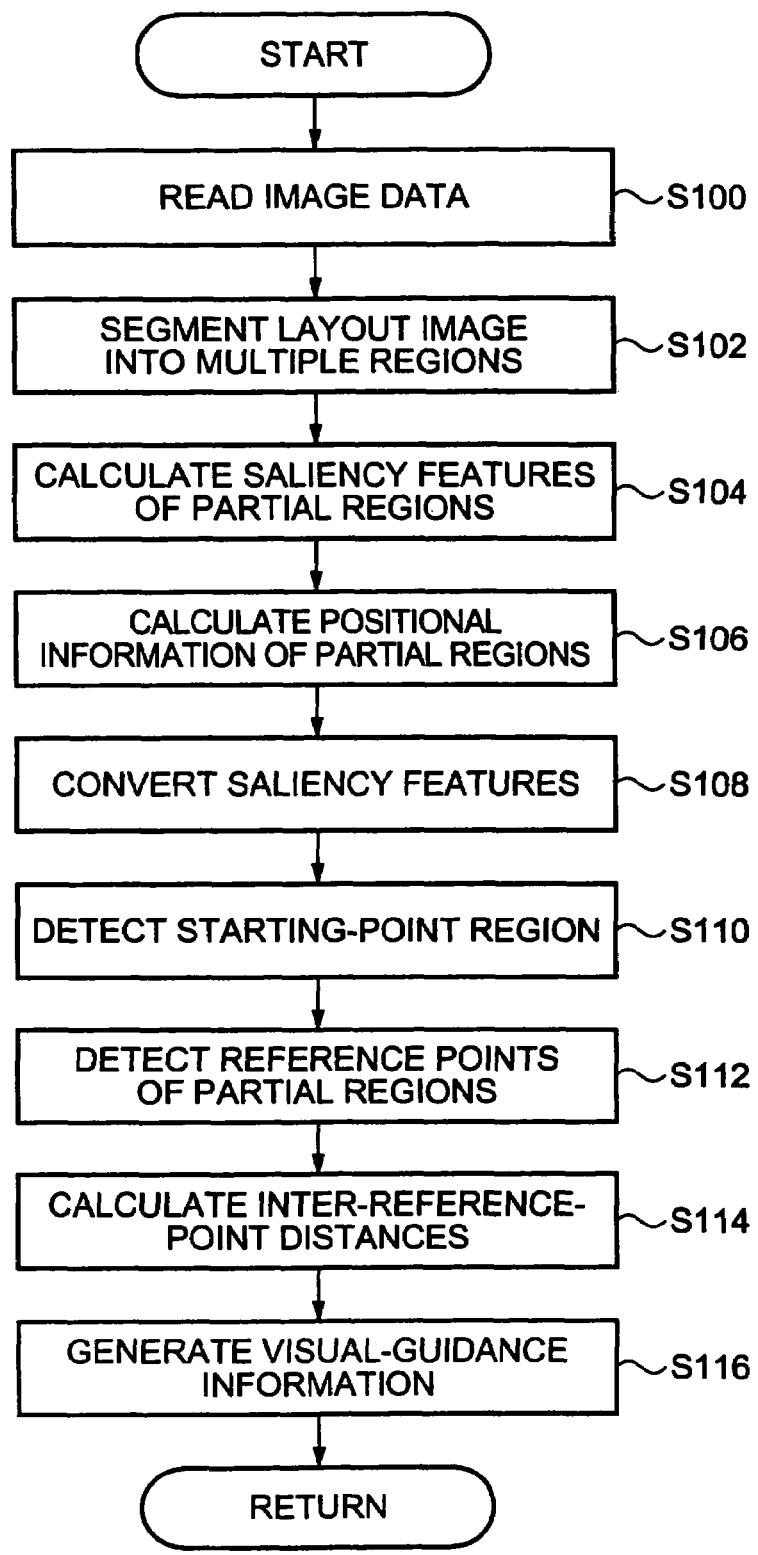
FIG. 5 is a flowchart for a visual-guidance-information generation process;.

FIG. 5 is a flowchart for the visual-guidance-information generation process.

By the visual-guidance-information generation process, visual-guidance information on how the line of sight is guided through layout elements is generated. When the process is executed by the CPU 30, the procedure moves to step S100, as shown in FIG. 5.

In step S100, image data is read from the storage unit 42. The procedure moves to step S102 wherein a layout image is segmented into multiple regions in accordance with the read image data and the procedure moves to step S104.

In step S104, the saliency feature of each partial region is calculated from the read image data. The procedure moves to step S106 wherein positional information indicative of the position of each partial region in the layout image is calculated on the basis of the read image data and then the procedure moves to step S108.

In step S108, the calculated saliency features are weighted to change the scale of the Z-axis in the visual-guidance feature space. The procedure moves to step S110 wherein a starting point region is detected from among the multiple partial regions on the basis of the calculated saliency features and then the procedure moves to step S112.

In step S112, the reference point of each partial region is detected from the visual-guidance feature space on the basis of the weighted saliency features and the calculated positional information. The procedure moves to step S114 wherein the distance between the detected reference points is calculated and then the procedure moves to step S116.

In step S116, visual-guidance information indicative of a visual guidance path is generated on the basis of the calculated distance between the reference points. The series of procedures are completed to return to the initial procedure.

Figure 6:
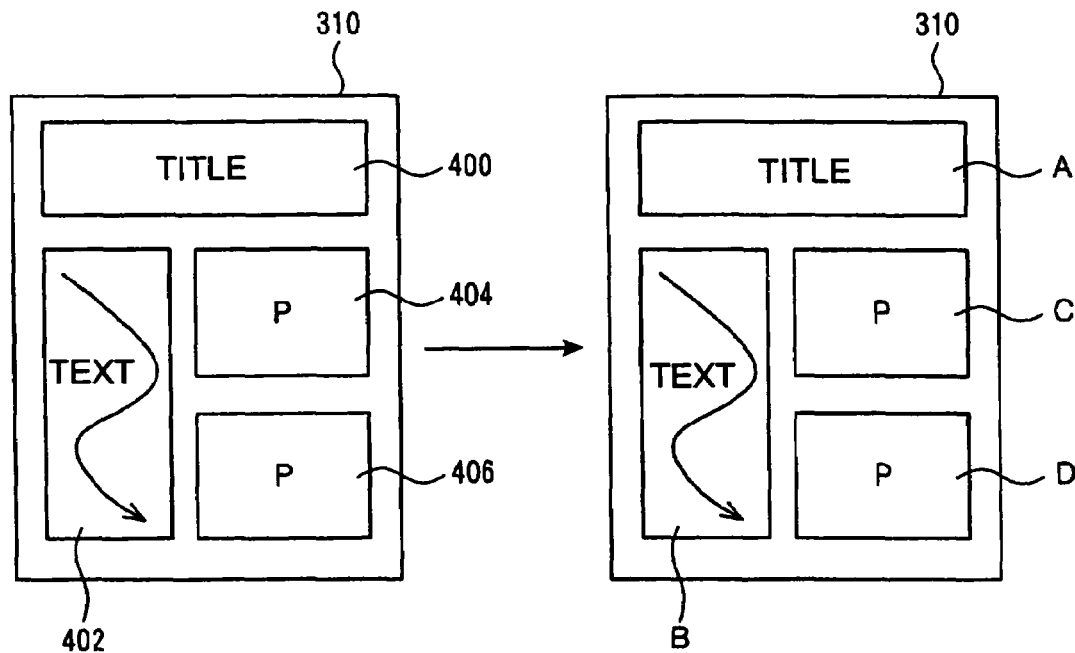
FIG. 6 is a schematic diagram showing segmentation of a layout image 310 into multiple regions.
Figure 7:
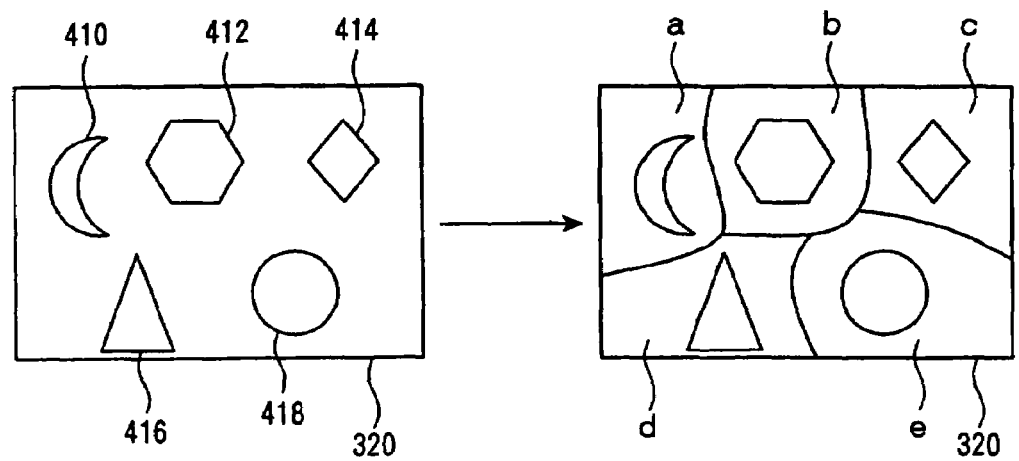
FIG. 7 is a schematic diagram showing segmentation of a layout image 320 into multiple regions.

Referring then to FIGS. 6 and 7, the region segmentation process in step S102 will be specifically described.

FIG. 6 is a schematic showing segmentation of a layout image 310 into multiple regions.

As shown in FIG. 6, the layout image 310 includes four layout elements 400, 402, 404, and 406 in a longitudinally rectangular region. In FIG. 6, the layout element 400 is located at the upper part and the layout elements 402 and 404 are arranged crosswise from the left below the layout element 400. The layout element 406 is disposed below the layout element 404.

The layout image 310 is configured as logical data in such a manner that the layout elements 400 to 406 are stored in respective information storage frames in accordance with a layout template which specifies the multiple information storage frames in predetermined layout regions by extensible markup language (XML) etc. In that case, information on the information storage frames is extracted from the layout template, so that the layout image 310 can be segmented into multiple regions. In the example of FIG. 6, partial regions A to D correspond to the respective regions of the layout elements 400 to 406.

FIG. 7 is a schematic showing segmentation of a layout image 320 into multiple regions.

As shown in FIG. 7, the layout image 320 includes five layout elements 410, 412, 414, 416, and 418 in a landscape rectangular region. In FIG. 7, the layout elements 410, 412, and 414 are arranged crosswise from the left in the upper-half region and the layout elements 416 and 418 are arranged crosswise from the left in the lower-half region.

The layout image 320 is configured as image data. In that case, the layout image 320 can be segmented into multiple regions by using known region-recognition techniques (for example, JP-B-61-32712 or related art document Shoji Tanaka, Seiji Inokuchi, Yuichi Iwadate, and Ryohei Nakatsu, "Gazouryoiki no iro oyobi texture no contrast wo tokuchoryo to shita zuryoiki no tyusyutsu (A Figure Region Extraction Method Based on the Color and Texture Contrasts of Image Regions as Assumed Features)", the journal of Information Processing Society of Japan, Vol. 40, No. 8, 1999). In the example of FIG. 7, partial regions a to e include the layout regions 410 to 418.

The process steps of FIG. 5 will be specifically described with the layout image 310 and the layout image 320 as examples.

Figure 8:
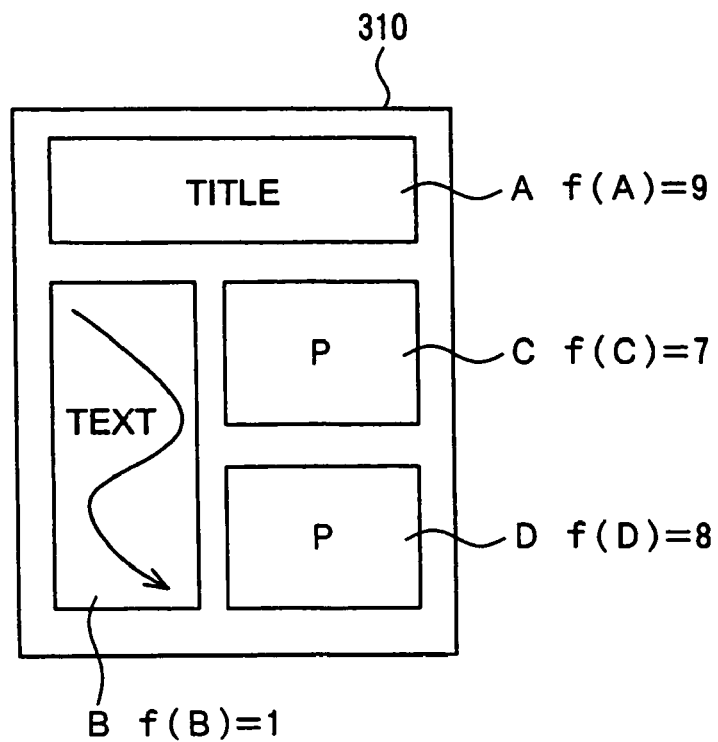
FIG. 8 is a schematic diagram showing calculation of the saliency features of partial regions A to D in the layout image 310.
Figure 9:
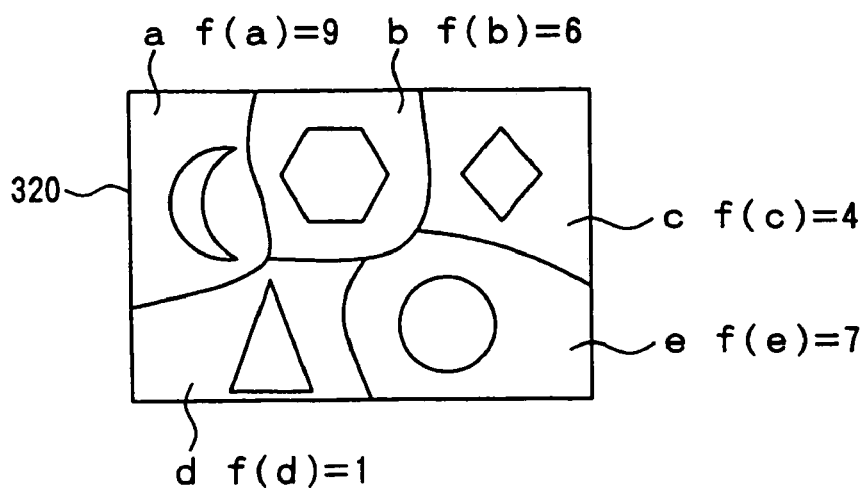
FIG. 9 is a schematic diagram showing calculation of the saliency features of partial regions a to e in the layout image 320.

Referring to FIGS. 8 and 9, the saliency-feature calculation process of step S104 will be described.

In step S104, a region on which a user will focus attention (hereinafter, referred to as an attention region) is extracted from among the partial regions and the degree of focusing attention on the attention region is calculated as a saliency feature. In this exemplary embodiment, the concept, "conspicuity," is used as the reference by which the attention region is extracted. The method for calculating the conspicuity is disclosed in detail in related art document JP-A-2001-126070 and related art document Shoji Tanaka, Seiji Inokuchi, Yuichi Iwadate, and Ryohei Nakatsu, "Gazouryoiki no iro oyobi texture no contrast wo tokuchoryo to shita zuryoiki no tyusyutsu (A Figure Region Extraction Method Based on the Color and Texture Contrasts of Image Regions as Assumed Features)", the journal of Information Processing Society of Japan, Vol. 40, No. 8, 1999.

The conspicuity will be described simply. Conspicuity is evaluated according to the physical features of the original image to extract an attention region. The conspicuity denotes a parameter according to human subjectivity. In extracting the attention region, the most salient region is extracted as an attention region from the evaluation. In other words, since the attention region is evaluated according to human subjectivity in accordance with the physical features, an attention region that matches the human subjectivity can be extracted.

For example, when the physical features include color heterogeneity, the conspicuity can be evaluated from the difference in color of the regions.

Since the physical features further include shape heterogeneity, area heterogeneity, and texture (pattern) heterogeneity, in addition to the color heterogeneity, evaluation of the conspicuity from at least one of the four heterogeneities allows proper evaluation of the conspicuity according to the features of the original image.

Evaluation of the three distinct properties of color (hue, saturation, and brightness) allows a region closest to a salient color (red) according to human subjectivity to be evaluated as the most salient region.

Evaluation of spatial frequency or the area of each region in the original image allows more proper evaluation of the most salient region.

The conspicuity is evaluated as follows:

(1) The original image is first segmented into regions, in which case the original image is segmented into a figure region and a picture region. The method for segmentation employs a boundary detection method based on "edge flow" described in related art document "Edge Flow: A Framework of Boundary Detection and Image Segmentation" by W. Y. Ma and B. S. Manjunath, IEEE, 1997.

(2) The segmented figure region is extracted and the conspicuity of the region is evaluated.

The outline of the conspicuity evaluation is as follows:

The heterogeneity conspicuity of each region is first determined, in which case color heterogeneity, texture heterogeneity, shape heterogeneity, and area heterogeneity are determined, to which a weighting factor is assigned to combine together linearly, thereby determining the heterogeneity conspicuity of each region. The feature conspicuity of each region is then determined, in which case color saliency, spatial frequency conspicuity, and area conspicuity are determined, to which a weighting factor is assigned to combine them linearly, thereby determining the feature conspicuity of each region.

The heterogeneity conspicuity and the feature conspicuity of each region are added to determine a feature additional value. The feature additional value is evaluated with a specified beta function to calculate the conspicuity.

(3) A pattern diagram in which conspicuity is evaluated is produced from the original image.

FIG. 8 is a schematic showing calculation of the saliency features of the partial regions A to D in the layout image 310.

Suppose the saliency features of the partial regions A to D calculated using the conspicuity are, e.g., 9, 1, 7, and 8, as shown in FIG. 8. Since the conspicuity can range from 0 to 10, also the saliency features can be calculated within the range from 0 to 10.

FIG. 9 is a schematic showing calculation of the saliency features of the partial regions a to e in the layout image 320.

Suppose the saliency features of the partial regions a to e calculated using the conspicuity are, e.g., 9, 6, 4, 1, and 7, as shown in FIG. 9.

The techniques of calculating the saliency features include the technique of determining an attention region from information on a discontinuous part and concentration difference in an image, as disclosed in related art documents Ruggero Milanese, "Detecting Salient Regions in an Image: From Biological Evidence to Computer Implementation," Ph. D. Theses, the University of Geneva, 1993, and Laurent Itti, Christof Koch and Ernst Niebur, "A Model of Saliency-based Visual Attention for Rapid Scene Analysis," IEEE Transaction on Pattern Analysis and Machine Intelligence, Vol. 20, No. 11, pp. 1254-1259, 1998; the technique of determining an attention region from brightness information as disclosed in related art documents Martin Jagersand: Saliency Maps and Attention Selection in Scale and Spatial Coordinates: An Information Theoretic Approach, Proc. ICCV'95, pp. 195-202, 1995 and Yoshinori Takeuchi, Noboru Ohnishi, Noboru Sugie, "Johoriron ni motozuita Active Vision System (Active Vision System Based on Information Theory)," Shingakuron, D-11, Vol. J81-D-II, No. 2, pp. 323-330, 1998; and the technique of determining an attention region from conspicuity, as disclosed in related art documents Shoji Tanaka, Masayuki Inoue, Masayoshi Inoue, and Ryohei Nakatsu, "Yumokusei ni kiyosuru butsuriteki tokutyoryo wo motonisita gazou-chumokuryoiki no tyusyutsu (Extraction of Image Salient Region Based on Physical Features which Contribute to Conspicuity)", the journal of Eizoh Joho Gakkai, Vol. 52, No. 6, pp. 881-890, 1998, Shoji Tanaka, Seiji Inokuchi, and Yuichi Iwadate, "A Figure Extraction Method Based on the Color and Texture Contrasts of Regions," IAPR ICIAP'99, 1999 (To appear in September), and Shoji Tanaka, Seiji Inokuchi, Yuichi Iwadate, and Ryohei Nakatsu, "Gazouryoiki no iro oyobi texture no contrast wo tokuchoryo to shita zuryoiki no tyusyutsu (A Figure Region Extraction Method Based on the Color and Texture Contrasts of Image Regions as Assumed Features)", the journal of Information Processing Society of Japan, Vol. 40, No. 8, 1999 (To appear in August, 1999).

Figure 10:
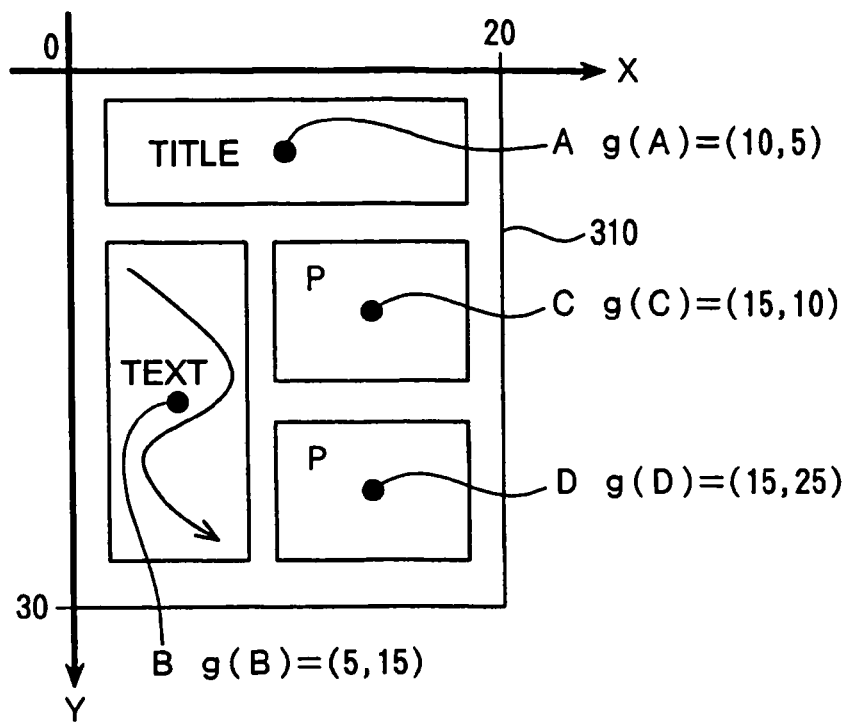
FIG. 10 is a schematic diagram showing calculation of the positional information of the partial regions A to D in the layout image 310.
Figure 11:
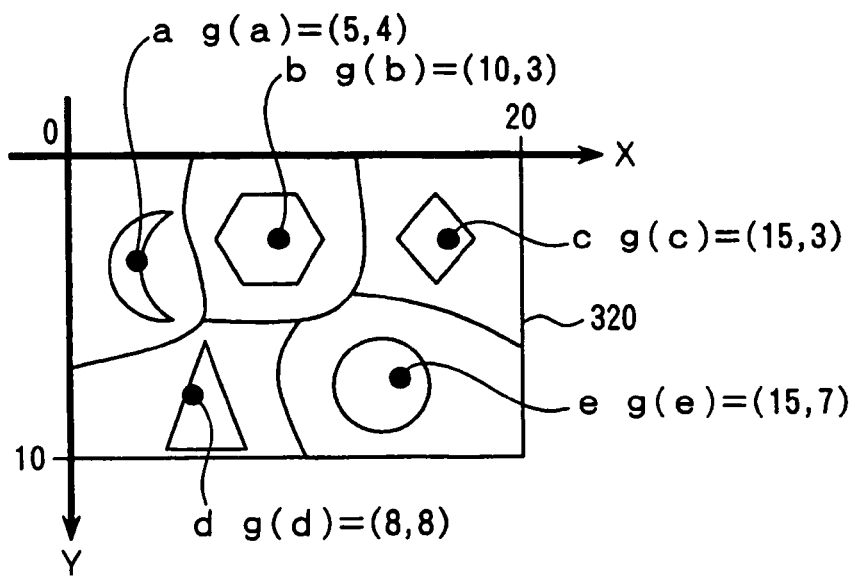
FIG. 11 is a schematic diagram showing calculation of the positional information of the partial regions a to e in the layout image 320.

Referring to FIGS. 10 and 11, the positional-information calculation process of step S106 will be specifically described.

FIG. 10 shows calculation of the positional information of the partial regions A to D in the layout image 310.

It is necessary to define the size of the layout image 310 to acquire the positional information. When the lateral length of the layout image 310 is defined as 20 and the longitudinal length is defined as 30, the positional information of the partial regions A to D are (10, 5), (5, 15), (15, 10), and (15, 25) at the barycenter of the partial regions A to D, respectively, as shown in FIG. 10. The first factor of the positional information indicates the X-axis coordinate of the visual-guidance feature space; the second factor indicates the Y-axis coordinate of the visual-guidance feature space.

FIG. 11 shows calculation of the positional information of the partial regions a to e in the layout image 320. When the lateral length of the layout image 320 is defined as 20 and the longitudinal length is defined as 10, the positional information of the partial regions a to e are (5, 4), (10, 3), (15, 3), (8, 8), and (15, 7) at the barycenter of the partial regions a to e, respectively, as shown in FIG. 11.

Referring to FIGS. 12 to 15, the saliency-feature conversion process of step S108 will be specifically described.

Figure 12:
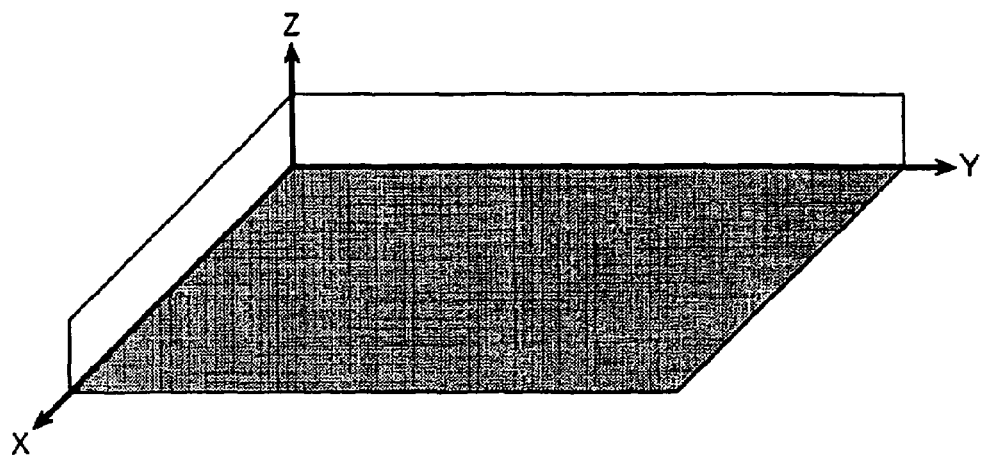
FIG. 12 is a schematic diagram showing a visual-guidance feature space when the scale of the saliency features is extremely smaller than that of the positional information.

FIG. 12 shows a visual-guidance feature space when the scale of the saliency features is extremely small relative to the positional information.

When the saliency features and the positional information are plotted along the X-, Y-, and Z-axis to define the visual-guidance feature space, the scale of the saliency features and the positional information are completely different depending on the unit system of the saliency features and the positional information, as shown in FIG. 12. Accordingly, if the values are assigned simply as they are, a proper eye flow cannot be acquired. For example, when the scale of the saliency features is extremely larger than that of the positional information, the positional information cannot be reflected to the generation of visual-guidance information. Conversely, when the scale of the saliency features is extremely smaller than that of the positional information, the saliency features cannot be reflected to the generation of visual-guidance information.

Figure 13:
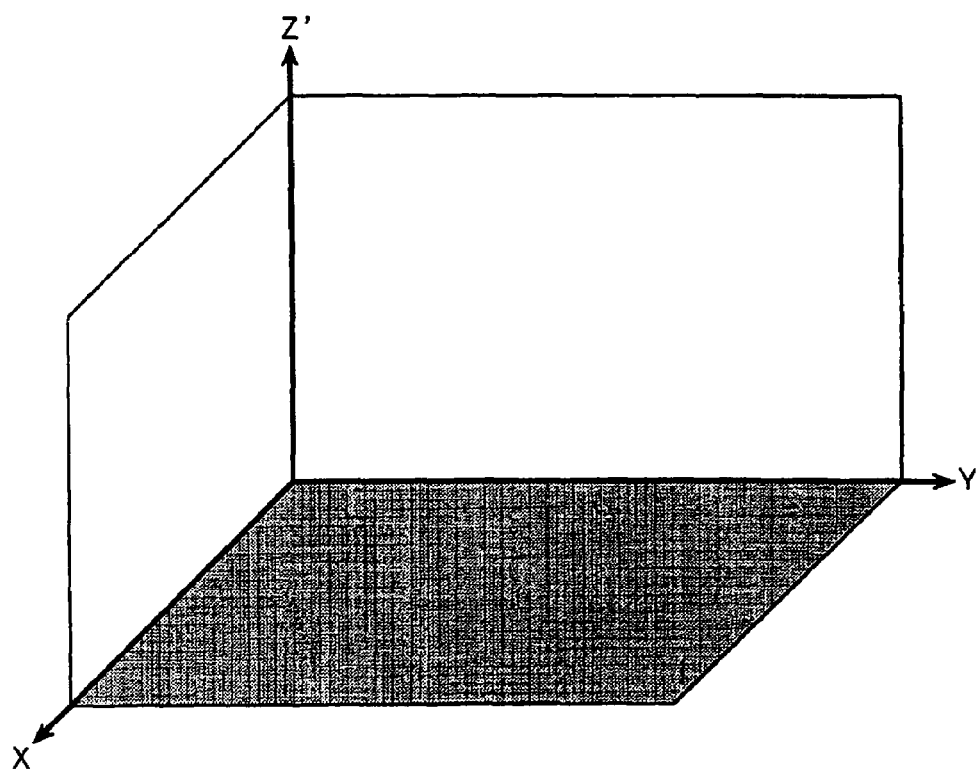
FIG. 13 is a schematic diagram showing a visual-guidance feature space when the scales of the saliency features and the positional information are adjusted to be substantially equal.

FIG. 13 shows a visual-guidance feature space when the scales of the saliency feature and the positional information are adjusted to be substantially equal.

In step S108, as shown in FIG. 13, the scale of the Z-axis in the visual-guidance feature space is changed by weighting the calculated saliency features so that the scales of the saliency features and the positional information become substantially equal.

Figures 14, 15, 16:
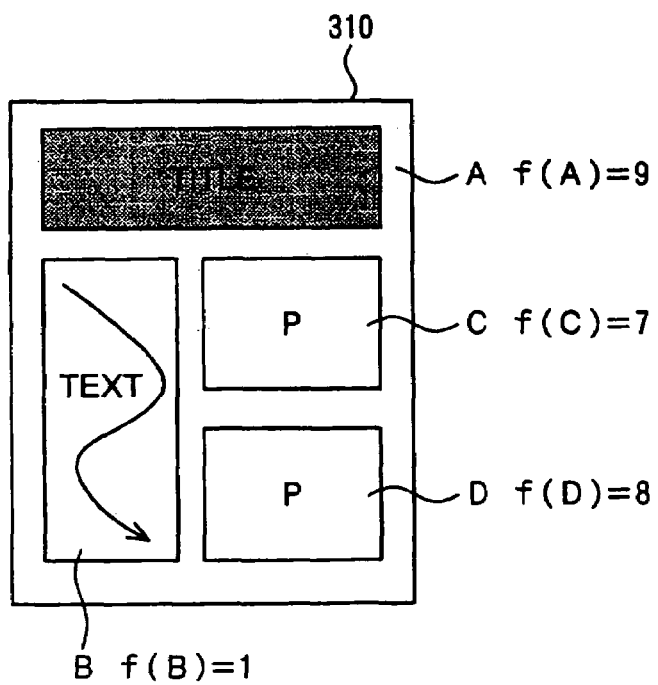
FIG. 14 is a table of the saliency features, the positional information, and the weighted saliency features of the partial regions A to D in the layout image 310.
FIG. 15 is a table of the saliency features, the positional information, and the weighted saliency features of the partial regions a to e in the layout image 320.
FIG. 16 is a schematic diagram showing detection of a starting-point region from among the partial regions A to D in the layout image 310.

FIG. 14 is a table of the saliency features, the positional information, and the weighted saliency features for each of the partial regions A to D in the layout image 310.

Referring to FIG. 14, fields X and Y indicate the first factor and the second factor of the positional information, field Z indicates the saliency features calculated in step S104, and field Z' indicates the weighted saliency features, respectively. The calculations in FIGS. 8 and 10 show that the saliency features range from 0 to 10 and the positional information ranges from 0 to 30. Accordingly, the scales of the saliency features and the positional information are adjusted to become substantially equal by weighting the saliency features by three times by the equation (1). Thus the X-axis and the Y-axis of the visual-guidance feature space are assigned the values of the fields X and Y; the Z-axis of the visual-guidance feature space is assigned the value of the field Z'. Equation (1) is defined as follows:

$$Z' = 3 \times Z \qquad (1)$$

FIG. 15 is a table of the saliency features, the positional information, and the weighted saliency features for each of the partial regions a to e in the layout image 320.

Referring to FIG. 15, the fields X and Y indicate the first factor and the second factor of the positional information, field Z indicates the saliency features calculated in step S104, and field Z' indicates the weighted saliency features, respectively. The calculations in FIGS. 9 and 11 show that the saliency features range from 0 to 10, while the positional information ranges from 0 to 20. Accordingly, the scales of the saliency features and the positional information are adjusted to become substantially equal by weighting the saliency features by three times by the foregoing equation (1). Thus the X-axis and the Y-axis of the visual-guidance feature space are assigned the values of the fields X and Y; the Z-axis of the visual-guidance feature space is assigned the value of the field Z'.

Figures 17, 18, 19:
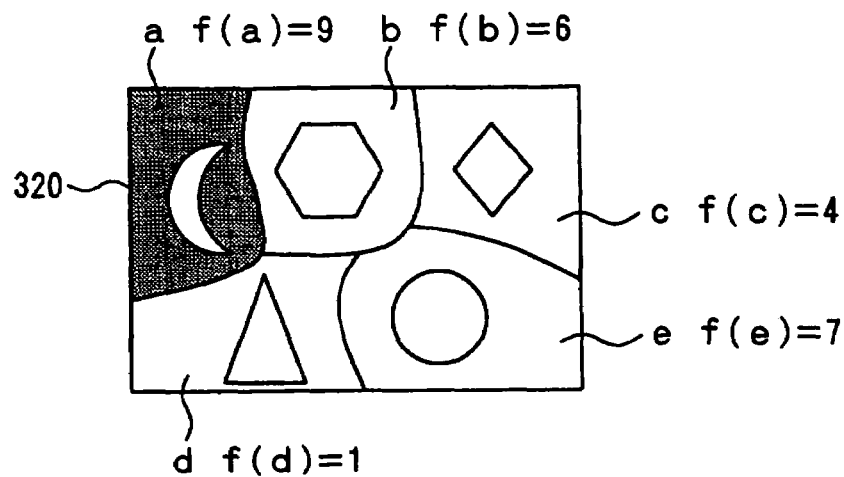
FIG. 17 is a schematic diagram showing detection of a starting-point region from among the partial regions a to e in the layout image 320.
FIG. 18 is a table of the reference points of the partial regions A to D in the layout image 310.
FIG. 19 is a table of the reference points of the partial regions a to e in the layout image 320.

Referring to FIGS. 16 and 17, the starting-point-region detection process of step S110 will be specifically described.

In step S110, a region that has the highest saliency feature of the multiple partial regions is detected as a starting-point region from the saliency features calculated in step S104.

FIG. 16 shows detection of a starting-point region from among the partial regions A to D in the layout image 310.

As shown in FIG. 16, the saliency features of the partial regions A to D are 9, 1, 7, and 8, respectively, which shows that the partial region A has the highest saliency feature. Thus the partial region A is detected as a starting-point region.

FIG. 17 shows detection of a starting-point region from among the partial regions a to e in the layout image 320.

As shown in FIG. 17, the saliency features of the partial regions a to e are 9, 6, 4, 1, and 7, respectively, which shows that the partial region a has the highest saliency feature. Thus the partial region a is detected as a starting-point region.

Referring then to FIGS. 18 and 19, the reference-point detection process of step S112 will be specifically described.

In step S112, the reference point of each partial region is detected as the coordinates of a visual-guidance feature space specified by the positional information and the weighted saliency feature of the partial region.

FIG. 18 is a table of the reference points of the partial regions A to D in the layout image 310.

As shown in FIG. 18, the reference points of the partial regions A to D are detected as (10, 5, 27), (5, 15, 9), (15, 10, 15), and (15, 25, 24), respectively.

FIG. 19 is a table of the reference points of the partial regions a to e in the layout image 320.

As shown in FIG. 19, the reference points of the partial regions a to e are detected as (5, 4, 27), (10, 3, 21), (15, 3, 15), (8, 8, 6), and (15, 7, 12), respectively.

Figures 20, 21, 22:
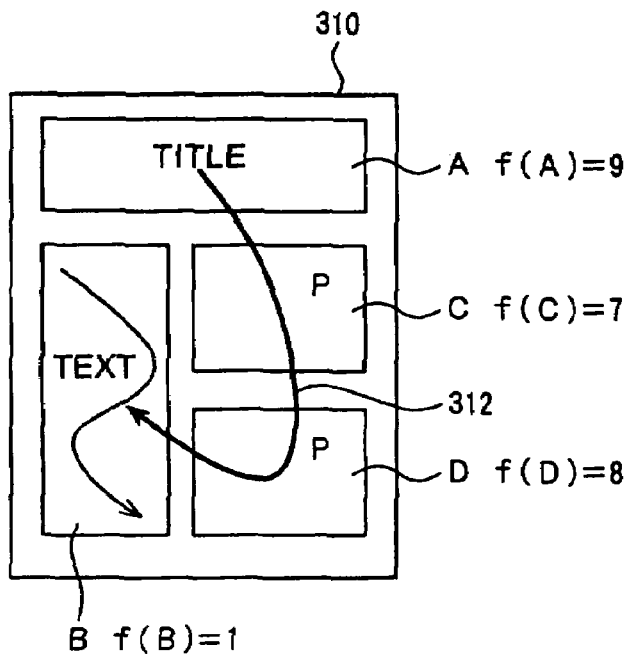
FIG. 20 is a table of the inter-reference-point distances of the partial regions A to D in the layout image 310.
FIG. 21 is a table of the inter-reference-point distances of the partial regions a to e in the layout image 320.
FIG. 22 is a schematic diagram showing calculation of the visual-guidance information of the layout image 310.

Referring to FIGS. 20 and 21, the inter-reference-point-distance calculation process of step S114 will be specifically described.

In step S114, Euclidean distances D between all possible pairs of detected reference points are calculated by the equation (2). In the equation (2), $\alpha x$, $\alpha y$, and $\alpha z$ are the coordinates of one reference point for finding the Euclidean distance; $\beta x$, $\beta y$, and $\beta z$ are the coordinates of the other reference point. Equation (2) is defined as follows:

$$D(\alpha,\beta)=\sqrt{(\alpha_x-\beta_x)^2+(\alpha_y-\beta_y)^2+(\alpha_z-\beta_z)^2} \qquad (2)$$

Although the definition of the distance between the reference points includes Mahalanobis distance etc. in addition to Euclidean distance, Euclidean distance is sufficient, because the saliency-feature conversion process in step S108 can be addressed or achieved even with other complicated distance scales.

FIG. 20 is a table of the inter-reference-point distances of the partial regions A to D in the layout image 310.

As shown in FIG. 20, the Euclidean distances between the reference point of the partial region A and the reference points of the partial regions B to D are 26.48, 9.27, and 20.83, respectively. The Euclidean distances between the reference point of the partial region B and the reference points of the partial regions C and D are 21.19 and 25.32, respectively. The Euclidean distance between the reference point of the partial region C and the reference point of the partial region D is 15.30.

FIG. 21 is a table of the inter-reference-point distances of the partial regions a to e in the layout image 320.

As shown in FIG. 21, the Euclidean distances between the reference point of the partial region a and the reference points of the partial regions b to e are 10.34, 18.06, 24.52, and 12.04, respectively. The Euclidean distances between the reference point of the partial region b and the reference points of the partial regions c to e are 7.81, 15.94, and 7.07, respectively. The Euclidean distances between the reference point of the partial region c and the reference points of the partial regions d and e are 12.45 and 9.85, respectively. The Euclidean distance between the reference point of the partial region d and the reference point of the partial region e is 19.34.

Figure 23:
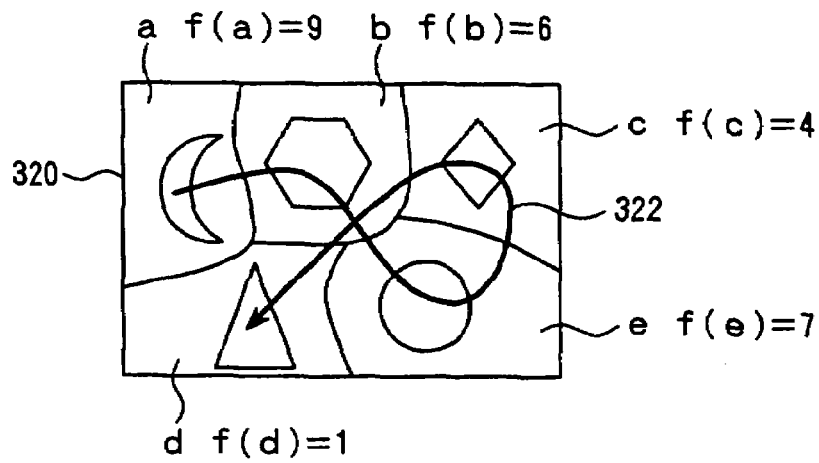
FIG. 23 is a schematic diagram showing calculation of the visual-guidance information of the layout image 320.

Referring to FIGS. 22 and 23, the visual-guidance-information generation process of step S116 will be specifically described.

In step S116, a visual guidance path is formed that passes through multiple partial regions in sequence with a starting partial region as a starting point and with a partial region that has the shortest inter-reference-point distance from the preceding partial region as the following partial region, and visual-guidance information indicative of the formed visual guidance path is generated.

FIG. 22 shows calculation of the visual-guidance information of the layout image 310.

The partial region A is determined as the starting point region from the detection in FIG. 16. A partial region having the shortest inter-reference-point distance from the partial region A is determined as the partial region C from the calculation of FIG. 20. Similarly, a partial region having the shortest inter-reference-point distance from the partial region C except already selected partial regions is determined as the partial region D. Accordingly, as shown in FIG. 22, a visual guidance path 312 is formed that passes through the partial regions A to D in order of the partial regions A, C, D, and B. In the example of FIG. 22, visual-guidance information indicative of the visual guidance path 312 is indicated by the solid-line arrow.

When the visual guidance path for the layout image 310 is formed in decreasing order of saliency feature, a visual guidance path is formed that passes through the partial regions A to D in order of the partial regions A, D, C, and B from the calculation in FIG. 8. In that case, since the partial region A and the partial region D are separated from each other, the line of sight is difficult to be guided in that order, having a low possibility of a proper eye flow.

FIG. 23 shows calculation of the visual-guidance information of the layout image 320.

The partial region a is determined as the starting point region from the detection in FIG. 17. A partial region having the shortest inter-reference-point distance from the partial region a is determined as the partial region b from the calculation of FIG. 21. Similarly, a partial region having the shortest inter-reference-point distance from the partial region b except already selected partial regions is determined as the partial region e. A partial region having the shortest inter-reference-point distance from the partial region e except already selected partial regions is determined as the partial region c. Accordingly, as shown in FIG. 23, a visual guidance path 322 is formed that passes through the partial regions a to e in order of the partial regions a, b, e, c, and d. In the example of FIG. 23, visual-guidance information indicative of the visual guidance path 322 is indicated by the solid-line arrow.

When the visual guidance path for the layout image 320 is formed in decreasing order of saliency feature, a visual guidance path is formed that passes through the partial regions a to e in order of the partial regions a, e, b, c, and d from the calculation in FIG. 9. In that case, since the partial region a and the partial region e are separated from each other, the line of sight is difficult to be guided in that order, having a low possibility of a proper eye flow.

The operation of the exemplary embodiment will then be described.

In the layout unit 100, through steps S100 and S102, image data is read out and the layout image is segmented into multiple regions on the bases of the read image data. In steps S104 through S108, the saliency features and the positional information of the partial regions are calculated on the basis of the read image data and the calculated saliency features are weighted.

In steps S110 and 112, a starting point region is detected from among multiple partial regions from the calculated saliency features and the reference points of the partial regions are detected from the visual-guidance feature space from the weighted saliency features and the calculated positional information. In steps S114 and S116, the distances between the detected reference points are calculated and then visual-guidance information is generated on the basis of the calculated inter-reference-point distances. The visual-guidance information is generated as a visual guidance path that passes through the partial regions in sequence with the starting point region as a starting point and a partial region having the shortest inter-reference-point distance from the preceding partial region as the following partial region.

The function of displaying the visual-guidance information can be incorporated as, for example, the function of supporting the edition of layout application. When an editor uses the visual-guidance-information display function during layout tasks with layout application, a visual guidance path that passes through layout elements in sequence in order of ease of visual guidance is displayed as visual-guidance information for the arrangement of the layout elements during layout tasks. The user can therefore address or achieve an easy-to-read layout with reference to the visual-guidance information.

Thus, in this exemplary embodiment, the layout image is segmented into multiple regions, of which the saliency features and the positional information are calculated, and visual-guidance information is generated on the basis of the calculated saliency features and positional information.

Accordingly, visual-guidance information can be generated in accordance with objective information and features of the partial regions without being influenced by the subjectivity of an editor. This allows quantitative calculation on how the line of sight tends to be guided through partial regions. Also, the visual-guidance information is generated in view of the position of partial regions in addition to the saliency features. This allows relatively proper calculation on how the line of sight tends to be guided through partial regions. Accordingly, a relatively proper eye flow can be determined quantitatively as compared with the related art.

Since there is no need to provide an eye camera etc. separately, the size and cost of the system can be reduced as compared with the related art.

Since the saliency features are not calculated by learning, a proper eye flow can be determined relatively reliably.

According to the exemplary embodiment, the reference points of the partial regions are detected from a visual-guidance feature space, the distances between the detected reference points are calculated, and then visual-guidance information is generated from the calculated inter-reference-point distances.

Accordingly, the visual-guidance information is generated with the saliency and the position of the partial regions as a distance on the visual-guidance feature space. Thus the saliency and the position of the partial regions can be reflected to the generation of visual-guidance information relatively properly. This offers more proper eye flow.

In this exemplary embodiment, the visual-guidance information indicative of a visual guidance path that passes through the partial regions in sequence is generated from the calculated inter-reference-point distances.

This facilitates grasping how the line of sight tends to be guided through the partial regions with reference to the visual-guidance information.

In this exemplary embodiment, a visual guidance path that passes through the partial regions in sequence is formed with a specified starting point region of multiple partial regions as a starting point and with a partial region having the shortest inter-reference-point distance from the preceding partial region as the following partial region. Then visual-guidance information indicative of the formed visual guidance path is generated.

Accordingly, the visual guidance path is formed by using the characteristic that the line of sight tends to be guided from a region with high saliency to a region with low saliency. This offers a more proper eye flow.

In this exemplary embodiment, a starting-point partial region is detected from among multiple partial regions from the calculated saliency features and then a visual guidance path is formed with the detected starting-point region as the starting point.

Accordingly, the starting-point partial region is detected on the basis of objective features of the partial regions without being influenced by the subjectivity of an editor. Accordingly, the starting point of an eye flow can be determined quantitatively.

According to the exemplary embodiment, a region having the highest saliency feature of the multiple partial regions is detected as the starting-point partial region on the basis of the calculated saliency features.

Thus, the starting-point partial region is detected by using the characteristic that the line of sight tends to be guided to a region of the highest saliency feature at first sight of the image, so that the starting point of an eye flow can be determined relatively properly.

According to the exemplary embodiment, any of the scales of the axes in the visual-guidance feature space can be changed.

This allows adjustment of the degree of reflection of the saliency features and position of the partial regions to the generation of visual-guidance information.

In the exemplary embodiment, step S104 corresponds to the saliency-feature acquisition device of exemplary embodiment 1, the saliency-feature calculation device of exemplary embodiment 2, the saliency-feature acquisition of exemplary embodiment 11 or 21, or the saliency-feature calculation of exemplary embodiment 12 or 22. Step S106 corresponds to the positional-information acquisition device of exemplary embodiment 1, the positional-information calculation device of exemplary embodiment 2, the positional-information acquisition of exemplary embodiment 11 or 21, or the positional-information calculation step of exemplary embodiment 12 or 22. Step S116 corresponds to the visual-guidance-information generation device of exemplary embodiments 1 to 3 and 5 to 8, or the visual-guidance-information generation of exemplary embodiments 11 to 13, 15 to 18, 21 to 23, and 25 to 28. Step S110 corresponds to the starting-point-region detection device of exemplary embodiment 3, 4, 8, or 9 or the starting-point-region detection of exemplary embodiments 13, 14, 18, 19, 23, 24, 28, or 29.

In the exemplary embodiment, step S112 corresponds to the reference-point detection device of exemplary embodiment 5, or the reference-point detection of exemplary embodiment 15 or 25. Step S114 corresponds to the inter-reference-point-distance calculation device of exemplary embodiment 5 or 6, or the inter-reference-point-distance calculation of exemplary embodiment 15, 16, 25, or 26. Step S108 corresponds to the scale change device of exemplary 10 or the scale change of exemplary embodiment 20 or 30.

Although the exemplary embodiment is constructed such that the saliency features are weighted by multiplication by a specified weighting factor, exemplary embodiments of the invention are not limited to that, but the saliency features may be weighted in such a way that the weighting factor is determined on the basis of human sensory characteristic that the output (sensitivity, or the degree of sense) is nonlinear relative to physical stimuli serving as input, and the saliency features are multiplied by the determined weighting factor.

For example, theories such as Fechner's law and Steven's power law are well known which define the change in sensitivity relative to physical stimuli. The saliency features can be a model in which saliency features are saturated logarithmically relative to the input of the saliency features or, conversely, a model in which saliency features increase exponentially relative to the input of saliency features using the theories. It cannot be determined unconditionally which of the logarithmic model or the exponential model is more advantageous, because it depends on the kind of a saliency feature serving as input.

Figure 24:
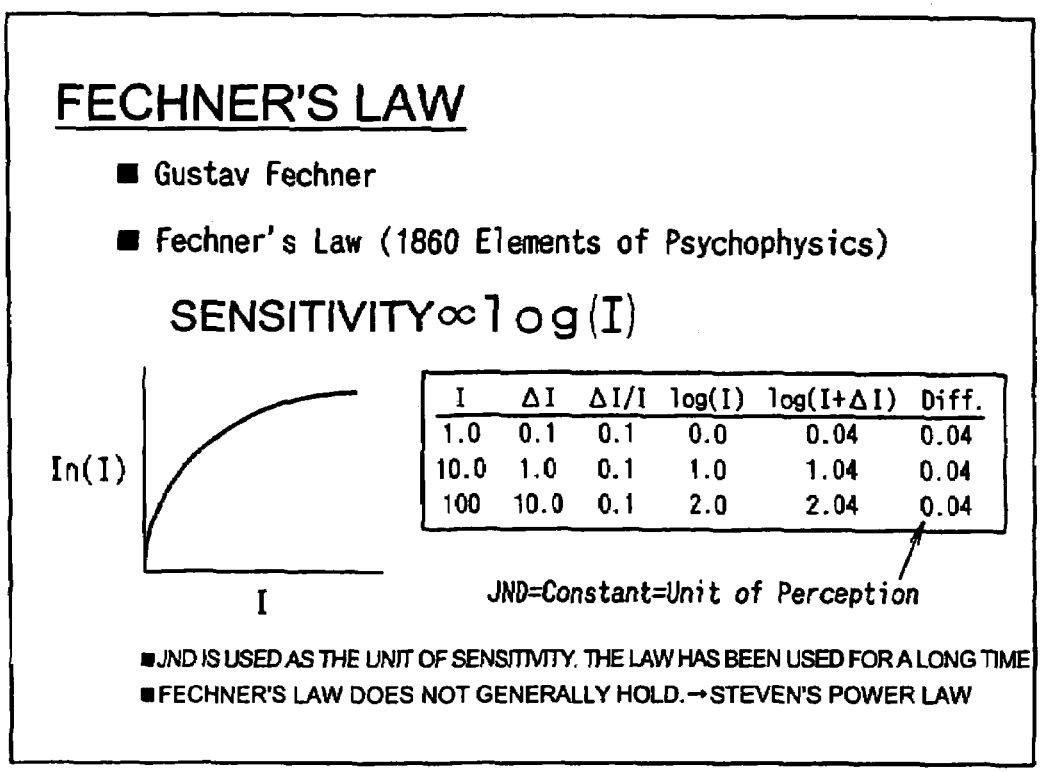
FIG. 24 is a schematic diagram showing the definition of the change in sensitivity relative to physical stimuli based on Fechner's law.

FIG. 24 shows the definition of the change in sensitivity relative to physical stimuli based on Fechner's law.

By Fechner's law, as shown in FIG. 24, the sensitivity changes logarithmically relative to stimulus I, becoming saturated in a region where the stimulus I is large. Accordingly, when Fechner's law is applied to saliency-feature conversion processing, equation (1) can be replaced with the following equation (3).

$$Z'=\log(Z) \qquad (3)$$

For example, even when a layout element having a high saliency feature is disposed in a complicated layout image including many layout elements, it is buried in the entire elements, becoming less conspicuous than viewed as a single element. This can be regarded as a logarithmic model.

The logarithmic model will be described with the layout image 310 as an example.

Figures 25, 26, 27:
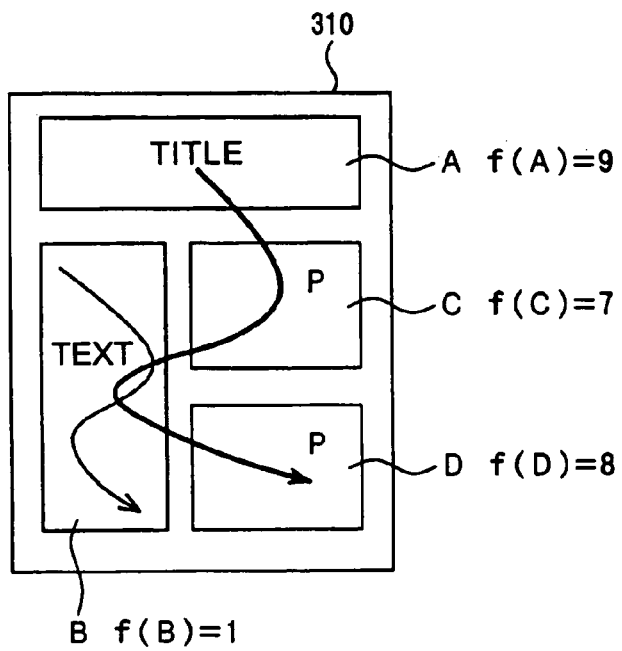
FIG. 25 is a table of the saliency features, the positional information, and the saliency features weighted by the logarithmic model of the partial regions A to D in the layout image 310.
FIG. 26 is a table of the inter-reference-point distances of the partial regions A to D in the layout image 310.
FIG. 27 is a schematic diagram of calculation of the visual-guidance information of the layout image 310.

FIG. 25 is a table of the saliency features, the positional information, and the saliency features weighted by the logarithmic model for the partial regions A to D in the layout image 310.

In FIG. 25, fields X and Y indicate the first and second factors of the positional information, field Z indicates the saliency features calculated in step S104, and field Z' indicates the saliency features weighted by the logarithmic model. The saliency features are weighted by the equation (4) with the logarithmic model so that the scales of the saliency features and the positional information become substantially equal. The factor by which the value of log(z) is multiplied is a weighting factor for adjusting the scales of the saliency features and the positional information.

$$Z'=30\times\log(Z) \qquad (4)$$

As shown in FIG. 25, the results of weighing to the saliency features for the partial regions A to D are 28.63, 23.34, 25.35, and 27.09.

FIG. 26 is a table of the inter-reference-point distances of the partial regions A to D in the layout image 310.

As shown in FIG. 26, the Euclidean distances between the reference point of the partial region A and the reference points of the partial regions B to D are 11.76, 7.26, and 20.62, respectively. The Euclidean distances between the reference point of the partial region B and the reference points of the partial regions C and D are 19.81 and 22.96, respectively. The Euclidean distance between the reference point of the partial region C and the reference point of the partial region D is 25.88.

FIG. 27 shows calculation of the visual-guidance information of the layout image 310.

The partial region A is determined as the starting point region from the detection in FIG. 16. A partial region having the shortest inter-reference-point distance from the partial region A is determined as the partial region C from the calculation of FIG. 26. Similarly, a partial region having the shortest inter-reference-point distance from the partial region C except already selected partial regions is determined as the partial region B. Accordingly, as shown in FIG. 27, a visual guidance path 314 is formed that passes through the partial regions A to D in order of the partial regions A, C, B, and D. In the example of FIG. 27, visual-guidance information indicative of the visual guidance path 314 is indicated by the solid-line arrow.

Figure 28:
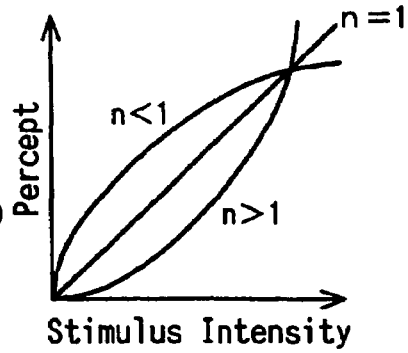
FIG. 28 is a diagram showing the definition of the change in sensitivity relative to physical stimuli based on Steven's power law.

FIG. 28 shows the definition of the change in sensitivity relative to physical stimuli based on Steven's power law.

By Steven's power law, the sensitivity changes exponentially relative to stimulus I. Accordingly, when Steven's power law is applied to saliency-feature conversion processing, equation (1) can be replaced with the following equation (5).

$$Z'=Z^n \qquad (5)$$

This allows calculation on how the line of sight tends to be guided through partial regions according to human sensitivity. Accordingly, this offers more proper eye flow.

Although the exemplary embodiment is constructed such that the saliency features are weighted by multiplication by a specified weighting factor, exemplary embodiments of the invention are not limited to that, but the saliency features may be weighted in such a way that the weighting factor is determined on the basis of the visual characteristic that human's field of view has a viewing angle, and so the visibility decreases out of the field of view, and the saliency features are multiplied by the determined weighting factor.

Figure 29:
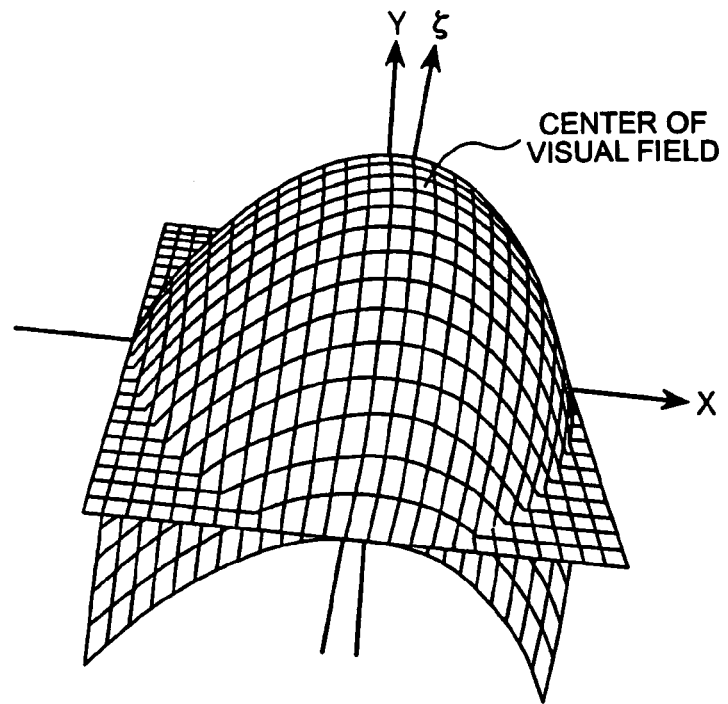
FIG. 29 is a schematic diagram showing the concept of a change in sensitivity relative to physical stimuli according to a human visual characteristic.
Figure 29:
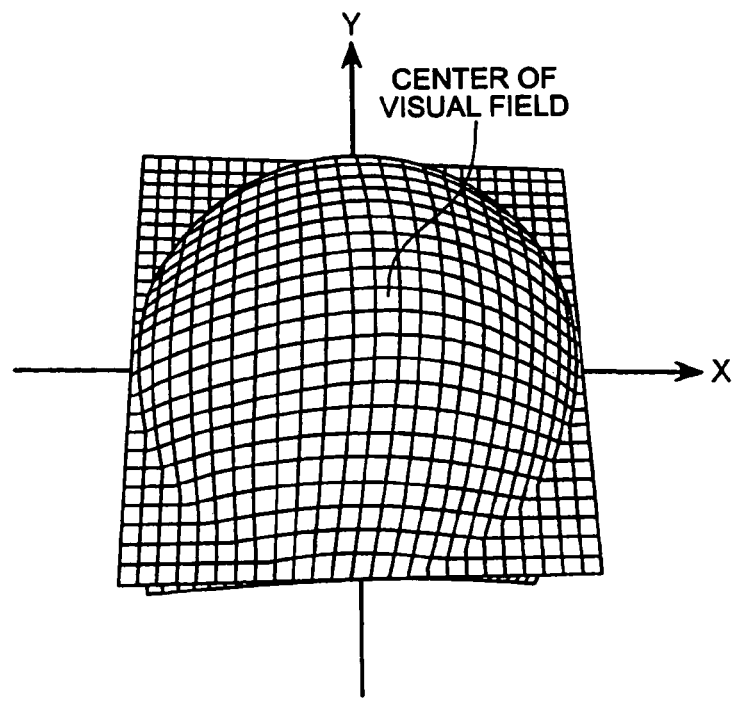

FIG. 29 shows the concept of a change in sensitivity relative to physical stimuli according to a human visual characteristic.

FIG. 29 shows a space surrounded by two equations (6) in the three-dimensional space in which the X-axis, Y-axis, and $\zeta$-axis intersect at right angles.

$$\zeta=-0.2\times X^2-0.2\times Y^2 \qquad (6)$$

The space surrounded by the X-Y plane and the two equations (6) has a curved plane in which the output decreases off the center, with the top of the dome as the center of the point of view. When such a curved plane is applied to saliency-feature conversion processing, the equation (1) can be replaced with the equation (7)

$$Z' = \zeta \times Z \quad (7)$$

This allows calculation on how the line of sight tends to be guided through partial regions according to human sensitivity. Thus, a more proper eye flow can be determined.

As is evident from that X and Y are needed for the arguments of the equation (6), the inter-reference-point distances cannot be determined collectively, as in the above-described examples. The saliency (Z') of the other region is obtained by using the distance from a starting-point partial region to the other partial region from one partial region (for example, the starting-point partial region). Upon moving to the other partial region, the same procedure is repeated with the partial region as a starting point. Otherwise the point of masking would be changed depending on the reference position. Accordingly, with this method, the starting point is first determined, and then the process is executed while the point for masking is being moved.

Although the foregoing exemplary embodiment is constructed such that the scale of the Z-axis of the visual-guidance feature space is changed by weighting saliency features, exemplary embodiments of the invention are not limited to that, but the scale of the X-axis or the Y-axis of the visual-guidance feature space can be changed by weighting the first factor or the second factor of the positional information.

Although the foregoing exemplary embodiment is constructed such that the saliency features and the positional information of the partial regions are calculated, exemplary embodiments of the invention are not limited to that, but the saliency features and the positional information of the partial regions are inputted from an input unit or acquired from an external terminal.

Although the foregoing exemplary embodiment is constructed such that region segmentation, calculation of saliency features, and calculation of positional information are performed based on image data, exemplary embodiments of the invention are not limited to that, but may be based on other data such as text data, a layout template, two-dimensional plane data capable of expressing the vertical interval depending on the saliency feature.

Figure 30:
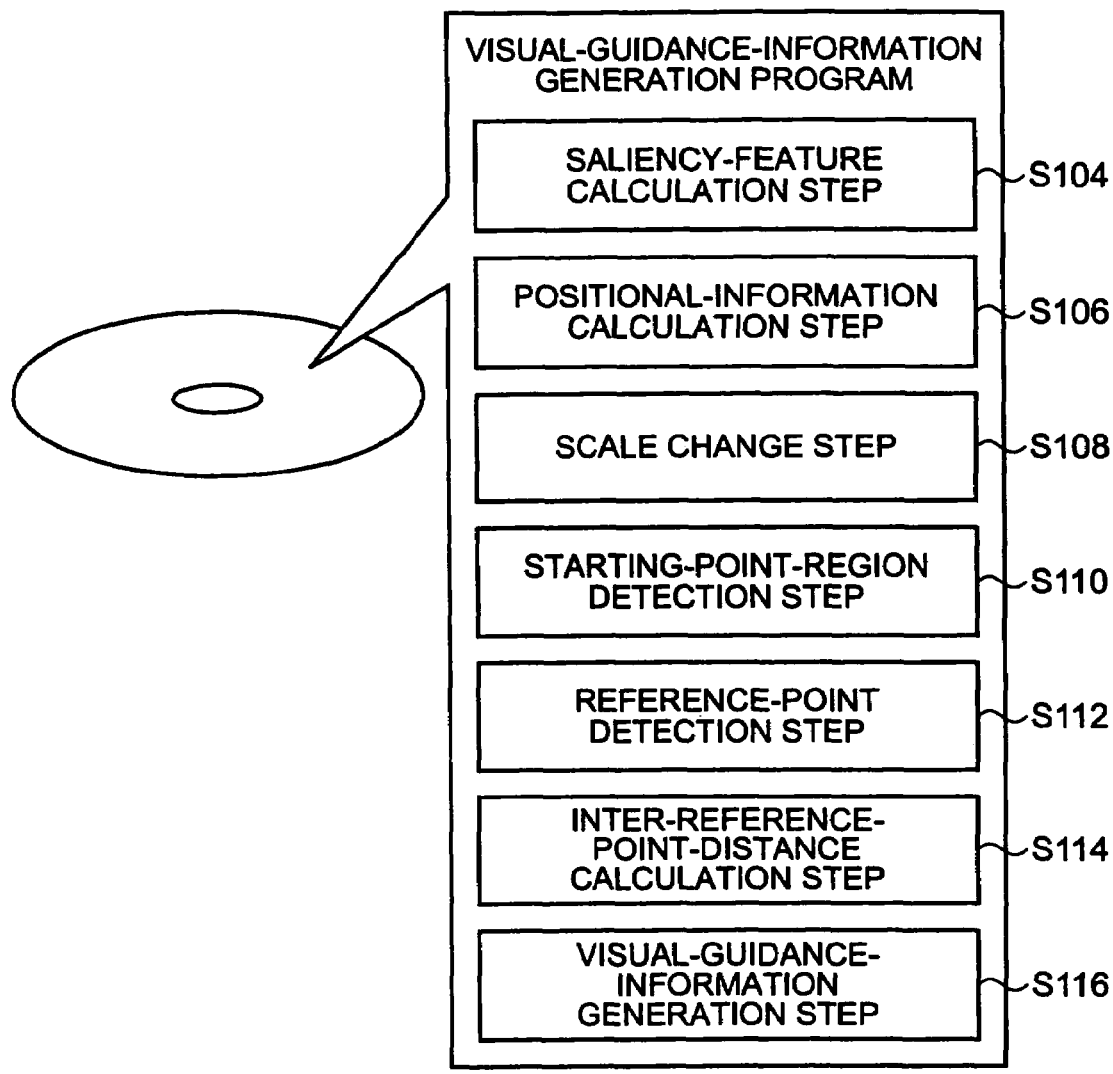
FIG. 30 is a schematic diagram of a storage medium and its data structure.

Although the foregoing exemplary embodiment has been described for the case in which a control program stored in the ROM 32 is executed to perform the process of the flowchart in FIG. 5, exemplary embodiment of the invention is not limited to that, but a program may be read from a storage medium that stores the program including the procedure into the RAM 34, as shown in FIG. 30.

FIG. 30 shows a storage medium and its data structure.

Here, examples of the storage medium include semiconductor storage media such as RAMs and ROMs, magnetic storage media such as FDs and HDs, optical scanning storage media such as CDs, CDVs, LDs, and DVDs, and magnetic storage/optical scanning storage media such as MOs, including any computer-readable storage media without making a distinction among electronic, magnetic, and optical reading systems.

In the foregoing exemplary embodiment, the system, the program, and the method to generate visual-guidance information according to exemplary embodiments of the invention are applied to generation of visual-guidance information that indicates how the line of sight is guided through layout elements in a layout image having multiple layout elements. However, it is to be understood that exemplary embodiment of the invention is not limited to that, and various exemplary modifications may be made without departing from the sprit and scope of exemplary embodiments of the invention.

What is claimed is:

1. A visual-guidance-information generation system for generating visual-guidance information indicating how the line of sight is guided through the segmented multiple partial regions of an image, the system comprising:

a saliency-feature acquisition device to acquire saliency features indicative of a degree of focusing attention on the partial regions; a positional-information acquisition device to acquire positional information indicative of a position of the partial regions in the image; and a visual-guidance-information generation device to generate the visual-guidance information based on the saliency features acquired by the saliency-feature acquisition device and the positional information acquired by the positional-information acquisition device; and a reference-point detection device to detect reference points of the partial regions from the visual-guidance feature space in which the saliency features and factors of the positional information are plotted in different axes; and a inter-reference-point-distance calculation device to calculate distances among the reference points detected by the reference-point detection device, the visual-guidance-information generation device generating the visual-guidance information based on the inter-reference-point distances calculated by the inter-reference-point-distance calculation device, the visual-guidance-information generation device generating visual-guidance information indicative of a visual guidance path that passes through the partial regions in sequence based on the inter-reference-point distances calculated by the inter-reference-point-distance calculation device, and the visual-guidance-information generation device forming the visual guidance path that passes through the partial regions in sequence, with a prescribed starting-point region of the multiple partial regions as a starting point and with a partial region having the shortest inter-reference-point distance from the preceding partial region as the following partial region, and generating visual-guidance information indicative of the formed visual guidance path.

2. A visual-guidance-information generation system for generating visual-guidance information indicating how the line of sight is guided through segmented partial regions of an image, the system comprising:

a saliency-feature calculation device to calculate saliency features indicative of a degree of focusing attention on the partial regions; a positional-information calculation device to calculate positional information indicative of a position of the partial regions in the image; and a visual-guidance-information generation device to generate the visual-guidance information based on the saliency features calculated by the saliency-feature calculation device and the positional information calculated by the positional-information calculation device; and a reference-point detection device to detect reference points of the partial regions from the visual-guidance feature space in which the saliency features and factors of the positional information are plotted in different axes; and a inter-reference-point-distance calculation device to calculate distances among the reference points detected by the reference-point detection device, the visual-guidance-information generation device generating the visual-guidance information based on the interreference-point distances calculated by the inter-reference-point-distance calculation device, the visual-guidance-information generation device generating visual-guidance information indicative of a visual guidance path that passes through the partial regions in sequence based on the inter-reference-point distances calculated by the inter-reference-point-distance calculation device, and the visual-guidance-information generation device forming the visual guidance path that passes through the partial regions in sequence, with a prescribed starting-point region of the multiple partial regions as a starting point and with a partial region having the shortest inter-reference-point distance from the preceding partial region as the following partial region, and generating visual-guidance information indicative of the formed visual guidance path.

3. The visual-guidance-information generation system according to claim 1, further comprising:

a starting-point-region detection device to detect a starting-point region from among the multiple partial regions based on the saliency features, the visual-guidance-information generation device forming a visual guidance path to guide the line of sight with the starting-point region detected by the starting-point-region detection device as a starting point and generating visual-guidance information indicative of the formed visual guidance path.

4. The visual-guidance-information generation system according to claim 3, the starting-point-region detection device detecting a region having a highest saliency feature of the multiple partial regions as the starting-point region on the basis of the saliency features.

5. The visual-guidance-information generation system according to claim 1, further comprising:

a starting-point-region detection device to detect the starting-point region from among the multiple partial regions based on the saliency features, the visual-guidance-information generation device forming the visual guidance path with the starting-point region detected by the starting-point-region detection device as a starting point.

6. The visual-guidance-information generation system according to claim 5, the starting-point-region detection device detecting a region having a highest saliency feature of the multiple partial regions as the starting-point region on the basis of the saliency features.

7. The visual-guidance-information generation system according to claim 1, further comprising:

a scale change device to change a scale of any of the axes of the visual-guidance feature space.

8. A computer readable medium storing a visual-guidance-information generation program that when executed by a computer is operable to perform a method to generate visual-guidance information indicating how the line of sight is guided through the segmented multiple partial regions of an image, the method comprising:

acquiring saliency features indicative of a degree of focusing attention on the partial regions;

acquiring positional information indicative of a position of the partial regions in the image; and generating the visual-guidance information based on the acquired saliency features and the acquired positional information;

detecting reference points of the partial regions from the visual-guidance feature space in which the saliency features and factors of the positional information are plotted in different axes;

calculating distances among the detected reference points;

generating the visual-guidance information based on calculated inter-reference-point distances;

generating visual-guidance information indicative of a visual guidance path that passes through the partial regions in sequence based on the calculated inter-reference-point distances;

forming the visual guidance path that passes through the partial regions in sequence, with a prescribed starting-point region of the multiple partial regions as a starting point and with a partial region having the shortest inter-reference-point distance from the preceding partial region as the following partial region, and generating visual-guidance information indicative of the formed visual guidance path.

9. A computer readable medium storing a visual-guidance-information generation program that when executed by a computer is operable to perform a method to generate visual-guidance information indicating how the line of sight is guided through segmented partial regions of an image, the method comprising:

calculating saliency features indicative of a degree of focusing attention on the partial regions;

calculating positional information indicative of a position of the partial regions in the image;

generating the visual-guidance information based on the calculated saliency features and the calculated positional information;

detecting reference points of the partial regions from the visual-guidance feature space in which the saliency features and factors of the positional information are plotted in different axes;

calculating distances among the detected reference points;

generating the visual-guidance information based on calculated inter-reference-point distances;

generating visual-guidance information indicative of a visual guidance path that passes through the partial regions in sequence based on the calculated inter-reference-point distances;

forming the visual guidance path that passes through the partial regions in sequence, with a prescribed starting-point region of the multiple partial regions as a starting point and with a partial region having the shortest inter-reference-point distance from the preceding partial region as the following partial region; and generating visual-guidance information indicative of the formed visual guidance path.

10. A visual-guidance-information generation method to generate visual-guidance information indicating how the line of sight is guided through the segmented multiple partial regions of an image, the method comprising:

acquiring saliency features indicative of a degree of focusing attention on the partial regions;

acquiring positional information indicative of a position of the partial regions in the image; and generating the visual-guidance information based on the saliency features acquired in the saliency-feature acquisition and the positional information acquired in the positional-information acquisition;

detecting reference points of the partial regions from the visual-guidance feature space in which the saliency features and factors of the positional information are plotted in different axes;

calculating distances among the detected reference points;

generating the visual-guidance information based on calculated inter-reference-point distances;

generating visual-guidance information indicative of a visual guidance path that passes through the partial regions in sequence based on the calculated inter-reference-point distances;

forming the visual guidance path that passes through the partial regions in sequence, with a prescribed starting-point region of the multiple partial regions as a starting point and with a partial region having the shortest inter-reference-point distance from the preceding partial region as the following partial region; and generating visual-guidance information indicative of the formed visual guidance path.

11. A visual-guidance-information generation method to generate visual-guidance information indicating how the line of sight is guided through segmented partial regions of an image, the method comprising:

calculating saliency features indicative of a degree of focusing attention on the partial regions;

calculating positional information indicative of a position of the partial regions in the image;

generating the visual-guidance information based on the calculated saliency features and the calculated positional information;

detecting reference points of the partial regions from the visual-guidance feature space in which the saliency features and factors of the positional information are plotted in different axes;

calculating distances among the detected reference points;

generating the visual-guidance information based on calculated inter-reference-point distances;

generating visual-guidance information indicative of a visual guidance path that passes through the partial regions in sequence based on the calculated inter-reference-point distances;

forming the visual guidance path that passes through the partial regions in sequence, with a prescribed starting-point region of the multiple partial regions as a starting point and with a partial region having the shortest inter-reference-point distance from the preceding partial region as the following partial region; and generating visual-guidance information indicative of the formed visual guidance path.

* * * * *